United States Patent [19]

Nagasato et al.

[11] Patent Number: 5,459,586
[45] Date of Patent: Oct. 17, 1995

[54] IMAGE PROCESSING SYSTEM PROVIDED WITH IMAGE ENCHASING AND SYNTHESIZING FUNCTION

[75] Inventors: Yoichi Nagasato; Hiroshi Sekine, both of Kanagawa; Kiyomasa Endoh, Tokyo, all of Japan

[73] Assignee: Fuji Xerox Co., Ltd., Tokyo, Japan

[21] Appl. No.: 960,820

[22] Filed: Oct. 14, 1992

[30] Foreign Application Priority Data

Oct. 16, 1991 [JP] Japan ..................... 3-267732

[51] Int. Cl.$^6$ .................................. H04N 1/21
[52] U.S. Cl. .................. 358/450; 358/452; 358/453
[58] Field of Search .................. 358/452, 453, 358/537, 538, 450, 540; 395/135, 146, 147

[56] References Cited

U.S. PATENT DOCUMENTS

| | | | |
|---|---|---|---|
| 4,814,831 | 3/1989 | Iwamoto | 355/40 |
| 4,896,208 | 1/1990 | Moyria et al. | 358/452 X |
| 4,914,475 | 4/1990 | Sugishima et al. | 358/450 X |
| 5,014,331 | 5/1991 | Kurogane et al. | 358/452 X |
| 5,028,991 | 7/1991 | Sekizawa et al. | 358/452 X |
| 5,029,224 | 7/1991 | Fujisawa | 358/453 X |
| 5,034,806 | 7/1991 | Ikeda et al. | 358/450 X |
| 5,075,787 | 12/1991 | Shaughnessy et al. | 358/452 |
| 5,302,967 | 4/1994 | Yonezawa et al. | 395/139 X |

FOREIGN PATENT DOCUMENTS 2-223275  9/1990  Japan.

*Primary Examiner*—Peter S. Wong
*Assistant Examiner*—Randy W. Gibson
*Attorney, Agent, or Firm*—Finnegan, Henderson, Farabow, Garrett & Dunner

[57] ABSTRACT

Disclosed is an image processing system which is provided with an image enchasing and synthesizing function for setting an image in a trimmed area of an extracted original sheet into a masked area on a base original sheet and synthesizing the images of the two original sheets. The image processing system includes an area setting section for setting up a masked area on a base original sheet and a trimmed area on an extracted original sheet with positions of the masked area and the trimmed area set properly in alignment with a center of a circumscribed rectangle, an image input section for performing a reading operation on the base original sheet and a reading operation on the extracted original sheet as adjusted to the trimmed area set by the area setting section, an image processing section for performing a masking operation on image data on the base original sheet and an enchasing operation for image data on the extracted original sheet on the basis of a setup of editing areas by the area setting section, and an image output section for putting out image data obtained by enchasing and synthesizing an image of the trimmed area in the masked area on the base original sheet.

8 Claims, 18 Drawing Sheets

|  | EXTRACTED AREA | MASKED AREA |
|---|---|---|
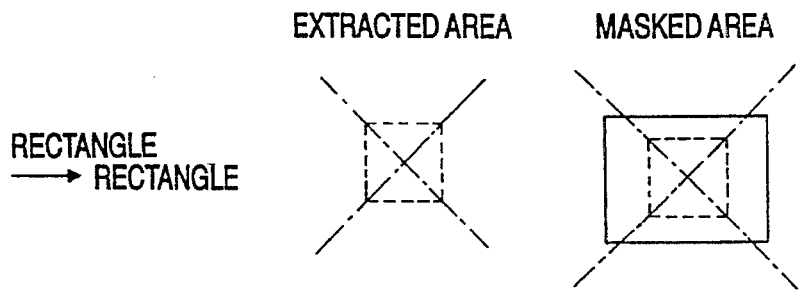
FIG. 3(a)  RECTANGLE → RECTANGLE
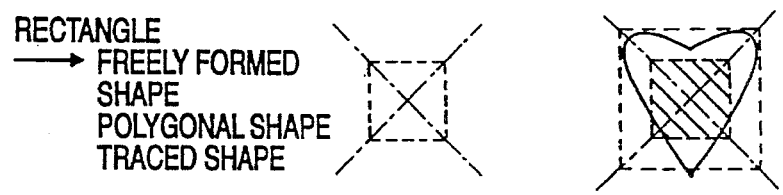
FIG. 3(b)  RECTANGLE → FREELY FORMED SHAPE / POLYGONAL SHAPE / TRACED SHAPE
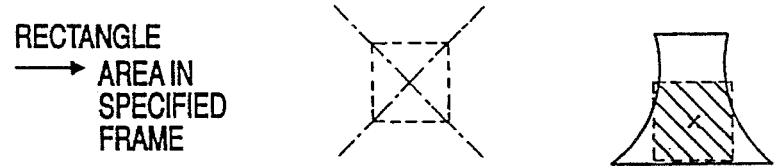
FIG. 3(c)  RECTANGLE → AREA IN SPECIFIED FRAME
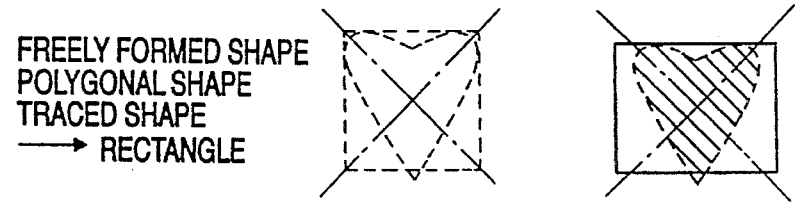
FIG. 3(d)  FREELY FORMED SHAPE / POLYGONAL SHAPE / TRACED SHAPE → RECTANGLE
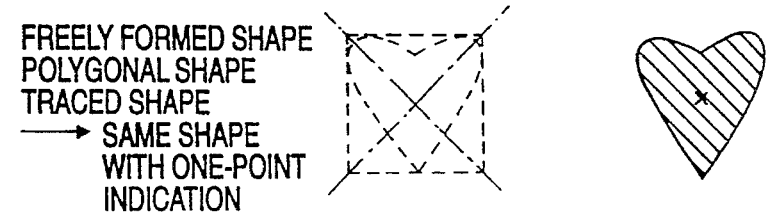
FIG. 3(e)  FREELY FORMED SHAPE / POLYGONAL SHAPE / TRACED SHAPE → SAME SHAPE WITH ONE-POINT INDICATION

IMAGE PROCESSING SYSTEM PROVIDED WITH IMAGE ENCHASING AND SYNTHESIZING FUNCTION

BACKGROUND OF THE INVENTION

The present invention relates to an image processing system which is provided with an image enchasing and synthesizing function for setting an image in a trimmed area of an extracted original sheet into a masked area on a base original sheet and synthesizing the images of the two original sheets.

FIG. 9 is a chart which illustrates an example of the construction of a conventional color digital copying machine (for example, such a copying machine described in Japanese Patent Unexamined Publication No. Hei. 2-223275), in which an image input terminal (IIT) 100 reads a color original sheet as decomposed into the three primary colors, namely, black (B), green (G), and red (R) of light by means of charge coupled device (CCD) line sensors and converts the read color signals into digital image data, and an image output terminal (IOT) 115 performs exposure with a laser beam and development and thereby reproduces the color image. Then, the devices ranging from an equivalent neutral density (END) converting circuit 101 to an IOT interface 110, which are positioned between the IIT 100 and the IOT 115, form an editorial processing system for such image data as mentioned above (image processing system: IPS), and this image processing system (IPS) converts such image data in B, G, and R into data in the colors of the coloring materials, namely, yellow (Y), magenta (M), cyan (C), and black (K) and feeds the IOT 115 with a coloring material signal corresponding to the particular color to be developed in each cycle of development.

Also, the IIT 100 reads the image data on each of the primary colors, B, G, and R in the size of 16 dots per mm for one pixel by means of a CCD line sensor and puts out the data in 24 bits (which are composed of eight bits for each of the three colors in 256 chromatic gradations). The CCD line sensors, which are respectively provided with a filter for B, G, or R on their top surfaces and have a length of 300 mm at the density of 16 dots per mm, perform a scan at the rate of 16 lines per mm at the processing speed of 190.5 mm/sec, and therefore puts out the read data on each of the colors at a speed of approximately 15 M pixels per second. Then, the IIT 100 performs a log conversion of the analog data on the pixels for B, G, and R, thereby converting the information based on the reflection factor into information on density and further converts the density information into digital data.

The image processing system (IPS) receives as input the signals on B, G, and R as subjected to a color decomposition from the IIT 100 and performs various kinds of data processing operations in order to enhance the quality of reproduction of the colors, the quality of reproduction of the chromatic gradations, the quality of reproduction of the details of images, and so forth, and converts the coloring material signals on the development process colors into on/off signals, to apply the signals obtained by this conversion to the IOT 115. The END converting module 101 makes adjustments (conversion) to form color signals as subjected to gray balancing, and a color masking module 102 converts the signals subjected to the gray balancing process into signals corresponding to the quantities of the coloring materials in Y, M, and C, by performing matrix arithmetic operations on the color signals on B, G, and R. An original sheet size detecting module 103 is a module which performs the detection of the size of the original sheet at the time of a pre-scan and a platen color erasure (frame erasure) at the time of an original sheet reading scan, and a color converting module 104 performs a conversion of a specified color in a specified area in accordance with an area signal fed to it from an area image control module 111. Then, an under-color removal (UCR) and black generating module 105 is a module which generates an adequate amount of black K, so that turbidity will not be caused in the colors, and reduces the process colors Y, M, and C by their respective equivalent amounts in accordance with the amount of the generated K and also serves as a gate for the K-signal and the signals as obtained on the process colors Y, M, and C after they are subjected to the under-color removal. A space filter 106 is a non-linear digital filter which is provided with the function for rectifying a blur and the function for removing a moire, and a tone reproduction control (TRC) module 107 performs such processes as density control, contrast control, negative-positive reversal, and color balancing for improving the quality of reproduced images. A reduction and magnification processing module 108 performs reducing and magnifying operations in the main scanning direction, and the reducing and magnifying operations in the subsidiary scanning direction are performed through adjustment of the scanning speed on the original sheet. A screen generator 109 converts the coloring material signals on the process colors expressed in multiple chromatic gradations into signals turned into on/off signals formed in binary values in accordance with the chromatic gradations and puts out the resulting signals, and these coloring material signals thus turned into binary signals are applied to the IOT 115 through the IOT interface module 110. Then, the area image control module 111 has an area generating circuit and a switch matrix, and the editing control module, which has an area command memory (plane memory) 112, a color palette video switch circuit 113, a font buffer 114, and so forth, performs multifarious editing controls.

An area image control module 111 has a construction by which it is capable of setting seven rectangular areas and their order of priority in the area generating circuit, and area control information will be set in the switch matrix in correspondence with the individual areas. The available control information includes information on color conversion, color modes, namely, monochromatic color or full colors, etc., information for the selection of modulations, such as those for photographs and characters, information for the selection of tone reproduction control (TRC), information for the selection of the screen generator, and so forth, and these types of control information are used for the control of the color masking module 102, the color converting module 104, the UCR and black generating module 105, the space filter 106, and the tone reproduction control (TRC) module 107. Moreover, the switch matrix may be set up with software.

The editing control module is a module which makes it possible to perform coloring of an outline drawing, by which the module reads an original sheet with a graph not in a rectangular shape but in a circular shape and paints out a specified area, which is not limited as to its shape, with a specified color, and, working with area commands in four bits written to four plane memories, sets editing commands at individual points on the original sheet in four bits on the four plane memories.

FIG. 10 is a chart illustrating an example of the construction of the plane memories, and this example shows a construction comprised of a total of six planes of memories, namely, two planes in binary values for works and four planes for picture drawing. As the plane memories are used to set commands for processing editing jobs on a given area, their memory capacity is reduced by reducing the resolving power to four dots per mm. Therefore, the plane memories in this example do not have such a high resolving power as will be fit for the input image screen, and these plane memories are constructed in such a manner as to be formed of four planes of memories having a capacity equivalent to a sheet in the Japanese standard A4 size measuring 432 mm in its length in the subsidiary scanning direction and 300 mm in the main scanning direction and as to be capable of sending out those colors and those patterns which correspond to the bit images of the editing commands written to the four planes of memories. Therefore, these plane memories are capable of performing such processing operations in $2^4$, i.e., sixteen different ways. The functions to be performed may be divided roughly into two types, which are "closed area coloring" (outline drawing painting), by which the blank area inside a closed area containing one specified point is painted out with an arbitrarily selected color or pattern, and "rectangular area coloring", by which the blank area inside a rectangular area defined by two points is painted out with an arbitrarily selected color or pattern. These two functions are applied in such various manners as coloring an area inside a frame, which is performed by specifying one point within the particular area, color conversion, which is performed by specifying an area with markers and converting black on a black and white original sheet, which is taken as the object of the processing operation, into an arbitrarily selected color, shadowing or an application of a mesh pattern, which retains the images of the original sheet, masking, which paints out the inside area of an area with white (forming a blank or transparent space), trimming, which, on the contrary, paints out the region outside of a specified area with white, a specified movement of an area, which works in a way similar to extraction, and painting, which does not leave any image of the original sheet in the specified area.

FIG. 11 is a chart showing examples of correspondences between the particulars of drawings on the plane memories and the area commands. The plane PW for a given work will, for example, take into itself the data in binary values at the time of a scan for outline painting or will take into itself a marker area at the time of a marker scan. The plane PM for a work is used for performing the image drawing operation over an area for an outline drawing coloring operation and also for the formation of an extracted area. Moreover, the planes P3 through 0, which are to be used for setting up commands thereon, form bit patterns into area commands, and, for example, the correspondences of the particulars of images drawn on the planes P3 through 0 to the area commands in such a case will be as shown in FIG. 11. In specific terms, it is assumed here that an area command is to be composed of four bits, which are "P3, P2, P1, and P0," respectively, and the area command for the area (1) in FIG. 11 will have "0" on the plane P3 while it has "1" on each of the planes P2, P1, and P0 and will therefore be "$0111_T$" ($07_H$), and the command for the area (2), which has "1" on the planes P3 and P1, will be "$1010_B$"($0A_H$), and the area command for the area (3), which has "0" on each of all the planes, will be "$0000_B$" ($00_H$).

The digital copying machine mentioned above is capable of producing image data in multiple chromatic gradations as processed in accordance with their type by the processing operations performed by the IPS, such as sharp images rendered with edge emphasis in the case of characters or the like, smoothed images produced by removal of moires and mesh points in the case of half-tone images like photographs, and color images attaining a high level of fidelity in reproduction with the vividness of colors properly adjusted, and, additionally, the copying machine thus operating with the IPS is not merely capable of performing such operations as trimming (i.e., extraction of an image) and masking (erasure of an image), as a matter of course, but also capable of performing a rich variety of editing functions, such as an insertion of a logogram, coloring, painting, color conversion, negative-positive reversal, size reduction/magnification, shift, and synthesis, in the course of processing of an original sheet. As compared with this IPS, the image input terminal (IIT) reads the signals representing the images on the original sheet as decomposed into the three primary colors, R (red), G (green), and B (blue) and thereafter converts the signals into digital signals, and then puts out the digital signals thus obtained. The image output terminal (IOT) puts out the digital signals by superimposing images in mesh points formed of the individual coloring materials in yellow (Y), magenta (M), cyan (C), and black (K) on the signals. Therefore, a color image processing apparatus, such as this color digital copying machine, employs developing devices for the coloring materials in the individual colors mentioned above and processes the full color data obtained by reading the original sheet at each time, performing scanning operations repeated four times.

FIG. 12 presents a chart showing the waveforms for a pre-scan and a copy scan to be performed in case the image enchasing and synthesizing function is to be performed, and FIGS. 13 (a) and 13 (b) present charts illustrating the manner how an original sheet is to be placed in case the image enchasing and synthesizing function is to be performed.

One of the editing functions performed by the color digital copying machine mentioned above is an image enchasing and synthesizing function. The image enchasing and synthesizing function consists of taking a first original sheet (namely, a base original sheet) as a background picture and enchasing an image in an extracted area (namely, a trimmed area) specified on a second original sheet (namely, an extracted original sheet) into the specified enchasing area (namely, a masked area) in the background picture. To perform this image enchasing and synthesizing function, the system in the copying machine first finds the paper size by a pre-scanning operation and then performs a copy scan based on the paper size and the specified area.

As a copy scan is to be performed on the base original sheet and the extracted original sheet, the copying machine will perform scanning operations in four cycles in order to transfer the toner images in the process colors, M, C, Y, and K as shown in FIG. 12 for each of the above-mentioned original sheets if the images to be processed are in full colors, but, the copying machine will finish its performance of the image enchasing and synthesizing function with only one cycle of scanning operation since it transfers only the toner image in black K in case the image to be processed is a black and white image. In other words, the copying machine performs copying operations for two sheets.

In the course of these operations, the copying machine performs a masking operation by performing scanning operations over the entire area of the base original sheet while it performs a trimming operation and an image shifting operation by performing scanning operations on the extracted area as specified on the extracted original sheet. In the time in which these operations are performed, the transfer unit in the IOT inhibits the discharge of the copy paper even if the copying operations for the first original sheet are finished and holds the copy paper until the copying operations for the second sheet are completed. The copying machine thus produces an enchased and synthesized image by performing an organic combination of the area specifying operation, the pre-scanning operation, the copy scanning operation, the masking operation, the trimming operation, the image shifting operation, and the paper discharge inhibiting operation in the manner described above.

In the specification of an area for a case in which the image enchasing and synthesizing function is to be performed, a base original sheet 652 and an extracted original sheet 653 are placed on the editing pad 650, and information on coordinates at two points, namely, $P_{11}$ ($x_{11}$, $y_{11}$), $P_{12}$ ($x_{12}$, $y_{12}$), $P_{21}$ ($x_{21}$, $y_{21}$), and $P_{22}$ ($x_{22}$, $y_{22}$) with respect to the enchasing area (namely, the masked area) 654 and the extracted area 655 of the two original sheets are entered as shown in FIG. 13 (a). On the basis of the information thus entered on the coordinates, the system determines a rectangular area which has these two points $P_{11}$ and $P_{12}$ as the summit points at the opposite angles, displaying this rectangular form as painted out, for example, in a position in the bit map area in correspondence with the values of the coordinates on the editing pad 650 and also displaying the extracted area 655 in the same manner. In addition, reference numeral 651 designates a registration position.

Subsequently, the magnification for the extracted area is set by operations on the magnification setting buttons. For example, in case "100%" has been selected out of the three available parameters, "100%," "automatic magnification," and "arbitrarily selected variable magnification," the system will set the image of the extracted area in its original size in the enchasing area and will thereby form a synthesized image, but, in case the parameter, "automatic magnification," has been selected, the system will enchase the enchasing area with the image of the extracted area, as differently magnified on the basis of the magnification in the direction x and the magnification in the direction y both of which the system determines on the basis of the size of the enchasing area and the size of the extracted area, and thus forms a synthesized image there. Further, in case "arbitrarily selected variable magnification" has been selected, the system magnifies or reduces the image of the extracted area at the magnification set up for it and then forms a synthesized image by setting the extracted image in the enchasing area.

When the start button is depressed, with the base original sheet 652 and the extracted original sheet 653 placed with its face down on the platen glass 660 as shown in FIG. 13 (b) upon completion of the area specification and the setup of the parameter, the system operates the imaging unit so as to move for a pre-scan under the entire surface of the platen glass, thereby determining the scanning range for the base original sheet 652 and also determining the size of the paper. Subsequently, the system separately performs copying operations for two sheets, namely, the base original sheet 652 and the extracted original sheet 653. In addition, reference numeral 661 designates a registration position.

On the first sheet in the copying operations, the system performs an operation for masking the enchasing area 654 on the base original sheet 652 in the range of the scanning operation based on the size of the base original sheet 652 and copies the image on this base original sheet onto a sheet of paper in the same size as that of the base original sheet 652. Therefore, in case the color mode is full colors rendered in four colors, the imaging unit repeatedly performs scanning operations four times in the range of the base original sheet 652 as shown in FIG. 12, and the system performs a masking operation on the data of the enchasing area 654 out of the image data and copies the image of the base original sheet, with the part of the enchasing area 654 masked, onto a sheet of paper in the same size as that of the base original sheet 652.

Moreover, in the ordinary copying operations, a sheet of paper with a copy formed thereon will be discharged upon completion of the copying operation for one sheet, but, in the case of the copying operations in the performance of this enchasing and synthesizing function, the system will shift to the copying operation for the next sheet, namely, the second sheet, while the copied paper is held in the transfer unit since the system inhibits the discharge of the first sheet of copy paper, as mentioned above, even if the copying operation for the first sheet is completed.

On the second sheet processed in the next copying operation, the system performs an partial moving operation for the extracted area 655 of the extracted original sheet 653. That is to say, the imaging unit performs scanning four times in the range leading farther to the point $P_{22}$ in the state in which it has moved, as shown in FIG. 12, from the home position to the position of the point $P_{21}$ shown in FIG. 13 (b). Then, the system extracts the image data in the range of the extracted area 655 out of these image data, magnifies or reduces the extracted image at the magnification set up in advance, and performs the processing operation for moving the image to the position of the enchasing area 654, to put out the image data thus obtained. In this regard, the operation for moving the extracted image as thus magnified or reduced is performed by the IPS in the main scanning direction but by the IIT in the subsidiary scanning direction. As the sheet of paper on which a copy of the first original sheet has been produced is held in the transfer unit while these moving operations are being performed, a copying operation for making a copy of the extracted original sheet on the same copy paper will produce he image of the extracted area 655 of the extracted original sheet with a high degree of accuracy in the enchasing area 654 as set on the base original sheet 652.

However, the enchasing and synthesizing function performed in the manner described above with the conventional color digital copying machine can produce a synthesized copy of images only after the copying machine performs the copying operations substantially for two sheets of copies, and the conventional machine has to take a longer period of time for producing a copy of enchased and synthesized images. In addition, the enchasing and synthesizing function performed with the conventional copying machine is faced with the problem that it can perform the enchasing and synthesizing function in no way other than enchasing a rectangular area (an extracted area) of the extracted original sheet into a rectangular area (an enchasing area) on the base original sheet.

SUMMARY OF THE INVENTION

An object of the present invention is to make it possible to produce an enchased and synthesized copy of images in the same duration of time as that required for producing an ordinary copy. Another object of the present invention is to make it possible to perform the enchasing and synthesizing function even in an area in a shape other than a rectangle.

In order to attain the above objects, the present invention offers an image processing system including area setting means for setting up a masked area on a base original sheet and a trimmed area on an extracted original sheet with positions of the masked area and the trimmed area set properly in alignment with a center of a circumscribed rectangle, image input means for performing a reading operation on the base original sheet and a reading operation on the extracted original sheet as adjusted to the trimmed area set by the area setting means, image processing means for performing a masking operation on image data on the base original sheet and an enchasing operation for image data on the extracted original sheet on the basis of a setup of editing areas by the area setting means, and image output means for putting out image data obtained by enchasing and synthesizing an image of the trimmed area in the masked area on the base original sheet.

BRIEF DESCRIPTION OF THE DRAWINGS

The manner by which the above objects and other objects, features and advantages of the present invention are attained will be fully evident from the following detailed description when it is considered in light of the drawings, wherein:

FIGS. 3 (a) through 3 (e) are sets of charts illustrating examples of the combination of areas in the performance of the enchasing and synthesizing function;

DETAILED DESCRIPTION OF THE PREFERRED EMBODIMENT

Figure 1:
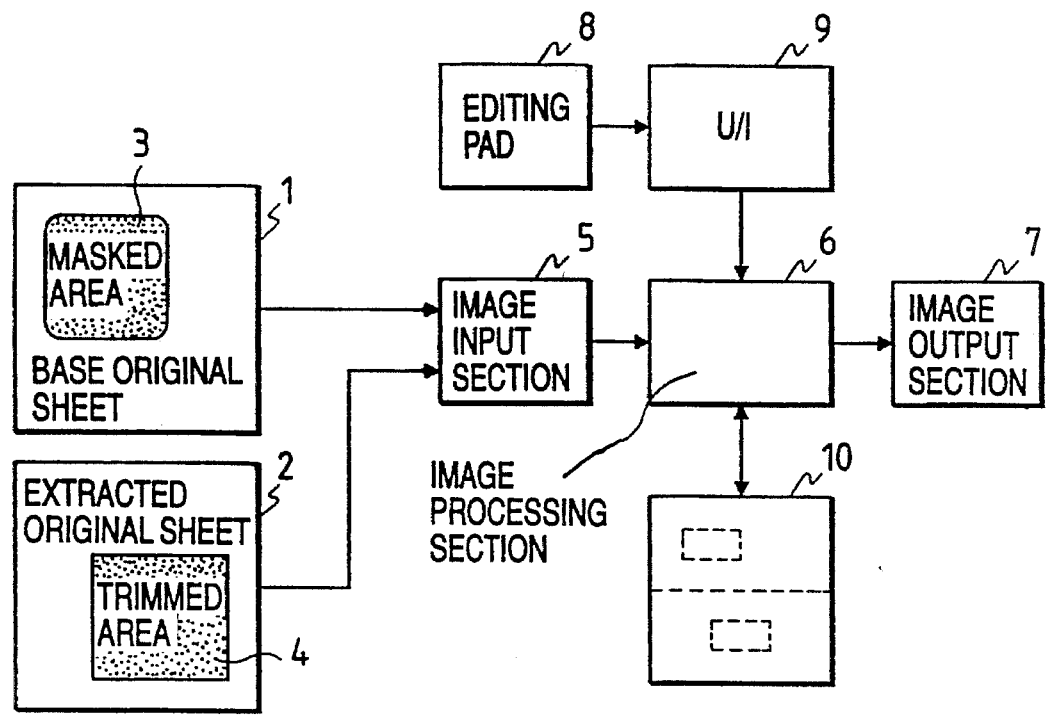
FIG. 1 is a block diagram illustrating a preferred embodiment of an image processing system provided with an enchasing and synthesizing function according to the present invention.

A preferred embodiment of the present invention will now be described with reference to the accompanying drawings, in which like reference numerals or marks designate the same or corresponding parts throughout the several drawings.

FIG. 1 is a diagram illustrating an embodiment of an image processing system provided with an enchasing and synthesizing function according to the present invention. In FIG. 1, reference numeral 1 designates a base original sheet; 2, an extracted original sheet; 3, a masked area; 4, a trimmed area; 5, an image input section; 6, an image processing section; 7, an image output section; 8, an editing pad; 9, a user interface (U/I); and 10, a plane memory.

Now, referring to FIG. 1, the image input section 5 is an image input terminal (IIT), which reads an original sheet as decomposed into the three primary colors of light, namely, blue (B), green (G), and red (R), by means of CCD line sensors and converts the read signals into digital image data, and the image output section 7 is an image output terminal (IOT), which reproduces the color images by performing exposure with a laser beam and development Then, the image processing section 6 forms a processing system for editing image data (namely, an image processing system: IPS), which converts the image data in B, G, and R into the process colors, yellow (Y), magenta (M), and cyan (C) of the coloring materials for the image data and further into black (K), performs the enchasing and synthesizing function according to the present invention, other editing processes, and the correcting and adjusting processes on the image data, and furnishes the output of the coloring material signals corresponding to the developed colors in each developing cycle to the image output section 7. The editing pad 8 is used for the input of information on the coordinates of an original sheet on the occasion when an editing process is performed, and the U/I 9 is a user interface which the user operates for performing various kinds of operations, such as the input of the selected functions, the input of operating commands, and other inputs by the user, and the output of the necessary messages. The plane memory 10 is used for setting commands for performing the enchasing and synthesizing function and other editing operations, and the image processing section 6 executes the enchasing and synthesizing process and other editing processes on the image data fed into it from the image input section 5 on the basis of the commands set in the plane memory 10.

The enchasing and synthesizing function according to the present invention sets the masked area 3 of the base original sheet 1 and the trimmed area 4 of the extracted original sheet 2 in the plane memory 10, and, when the base original sheet 1 and the extracted original sheet 2 are read by copy scans performed by the image input section 5, the image processing section 6 performs a synthesizing process by which the image in the trimmed area 4 is enchased in the image in the masked area 3 of the base original sheet 1, with the masked area 3 cut out therefrom, and the two images are then synthesized into a synthesized image, which the image output section 7 puts out in the form of an enchased and synthesized image.

Figure 2:
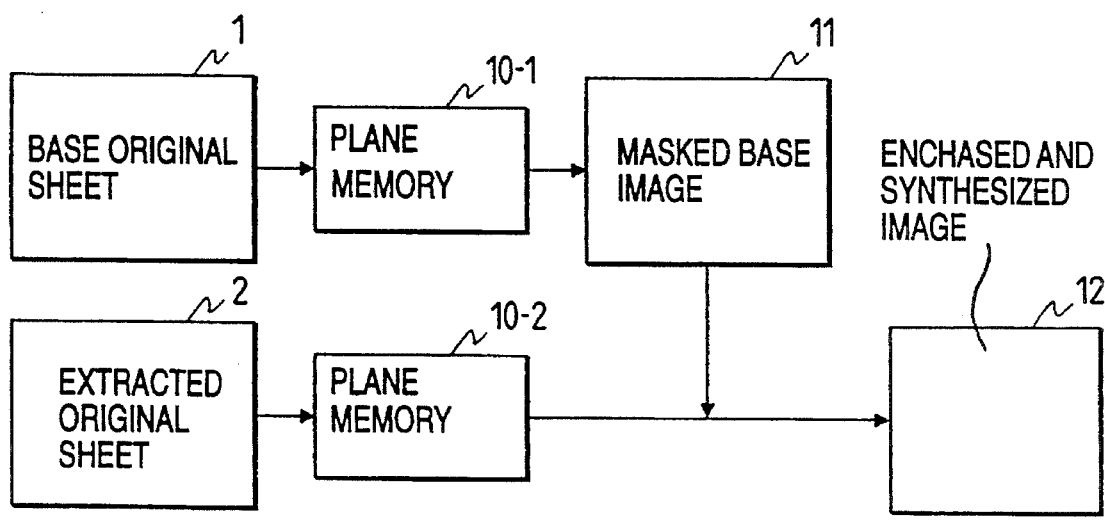
FIG. 2 is a block diagram for explaining the output produced by the enchasing and synthesizing function.
Figure 4A:
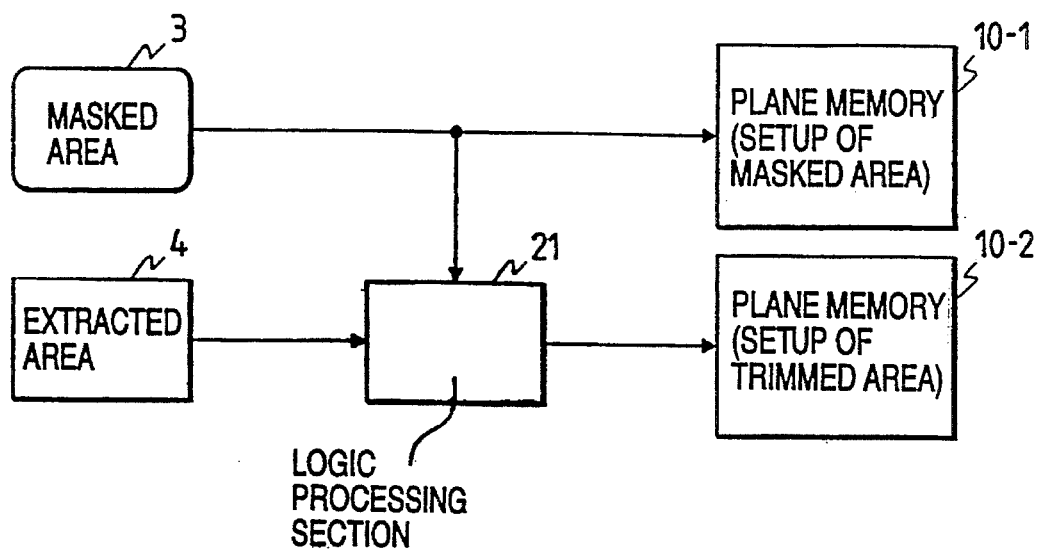
FIGS. 4 (a) and 4 (b) are block diagrams for explaining the setup of the plane memory.
Figure 4B:
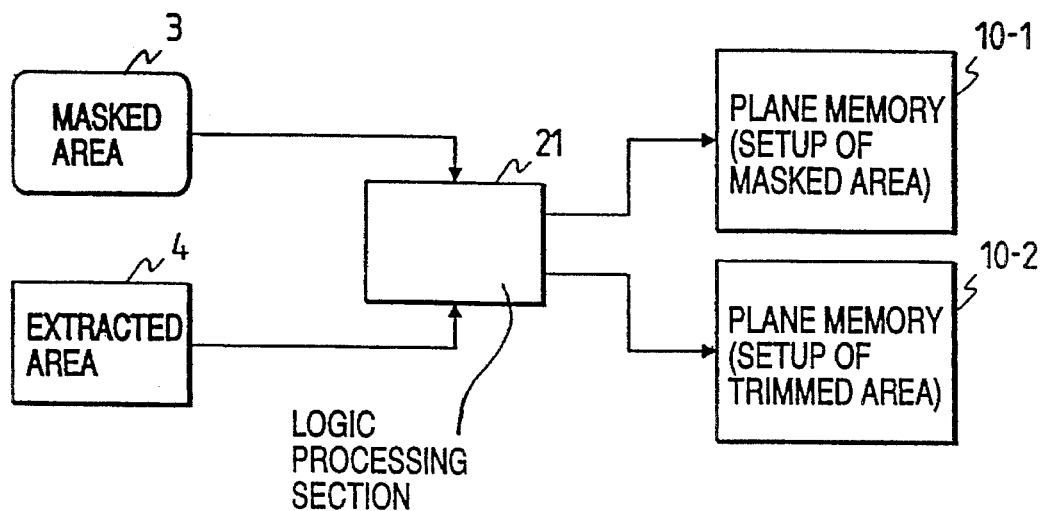
Figure 5:
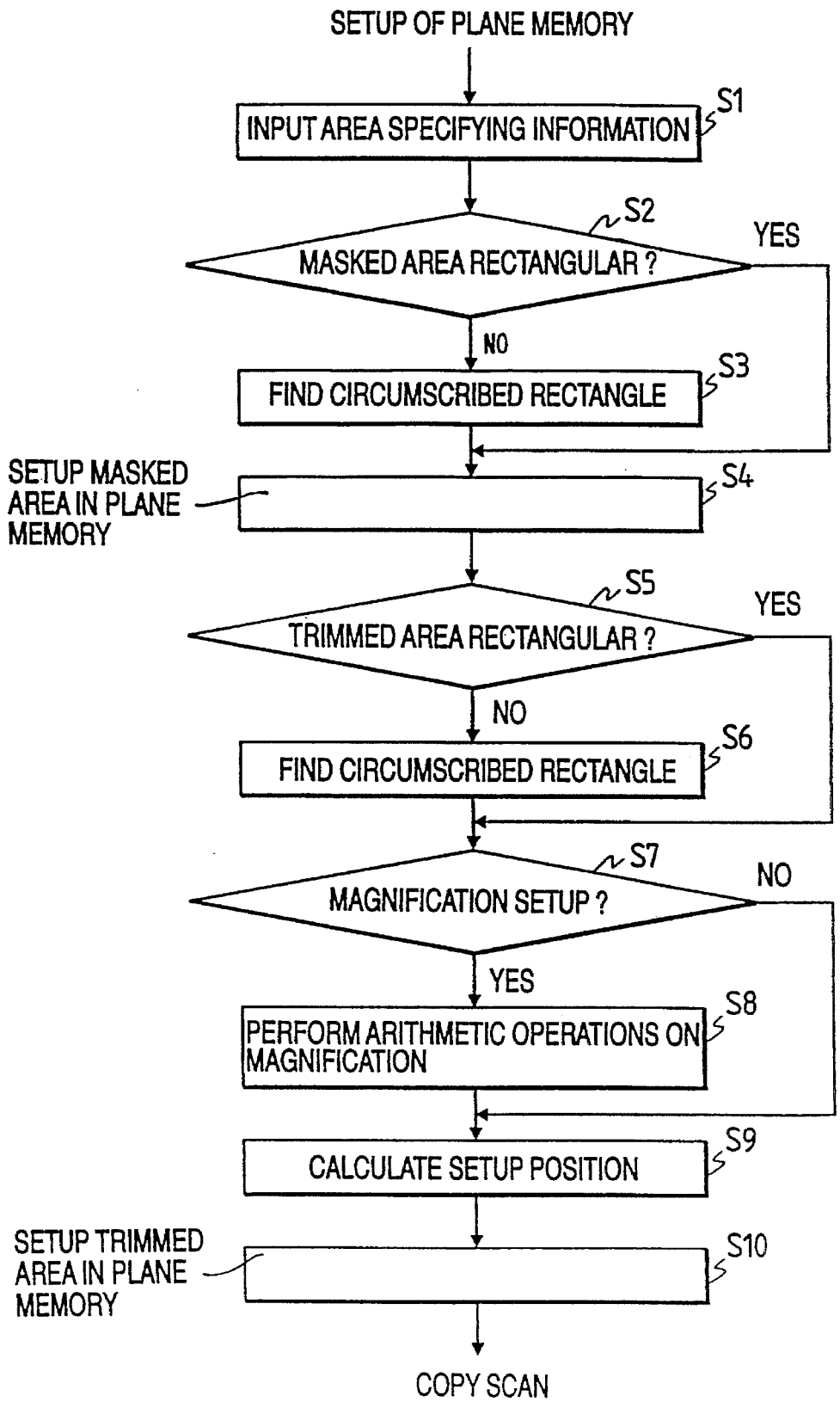
FIG. 5 is a flow chart illustrating a description of the flow of operations for processing the setup of areas.
Figure 6A:
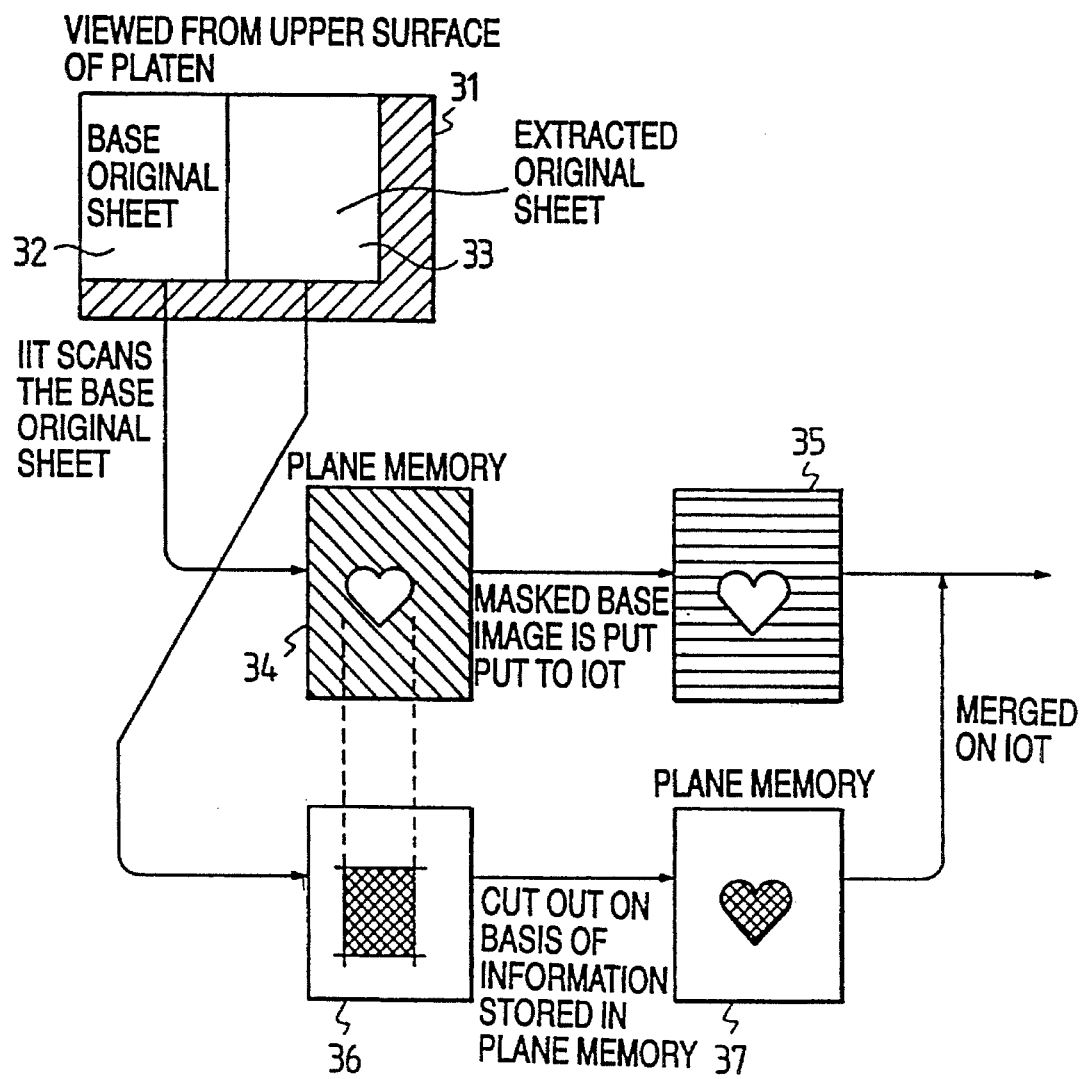
FIGS. 6 (a) through 6 (f) are diagrams for explaining examples of the processing operations for the performance of the enchasing and synthesizing function.
Figure 6B:
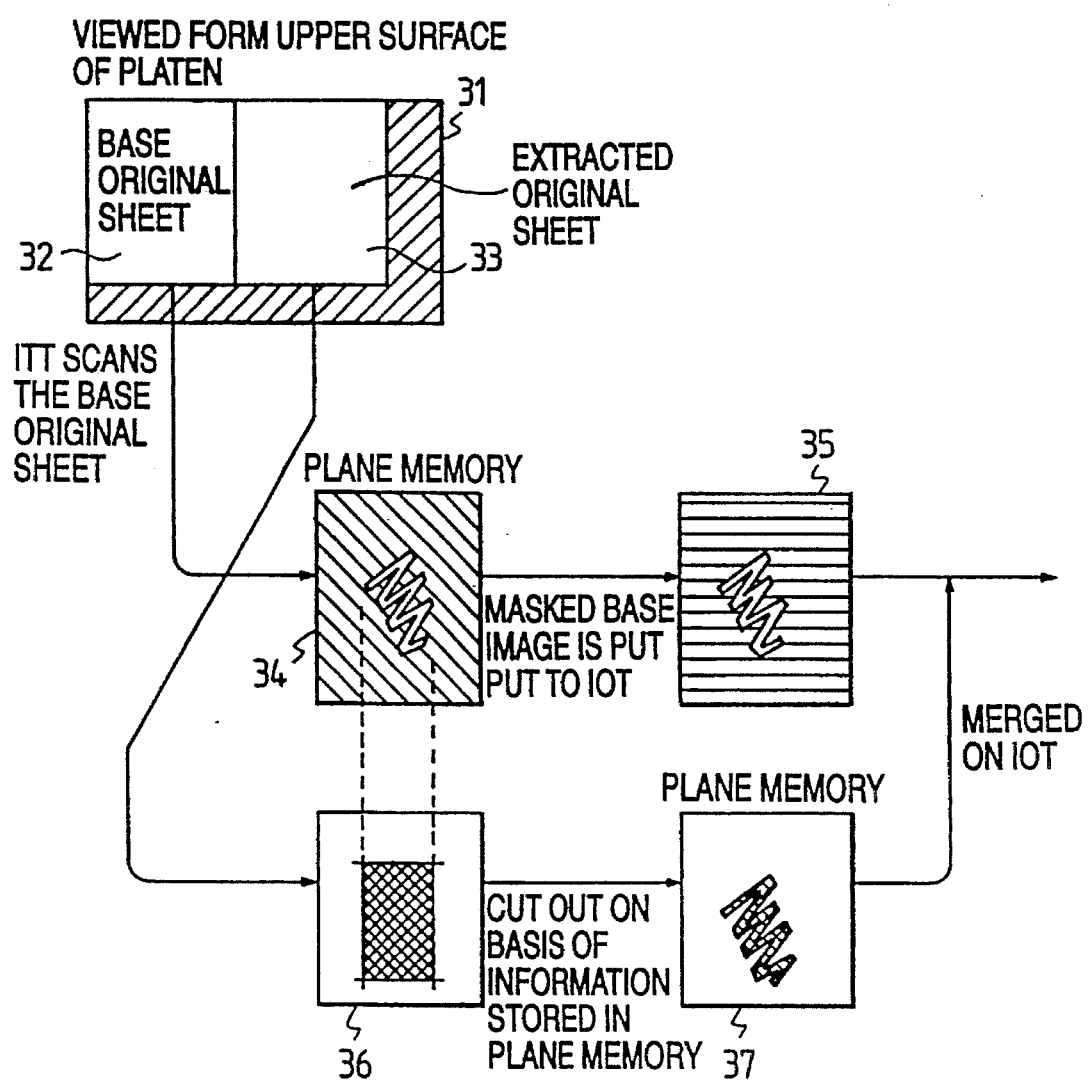
Figure 6C:
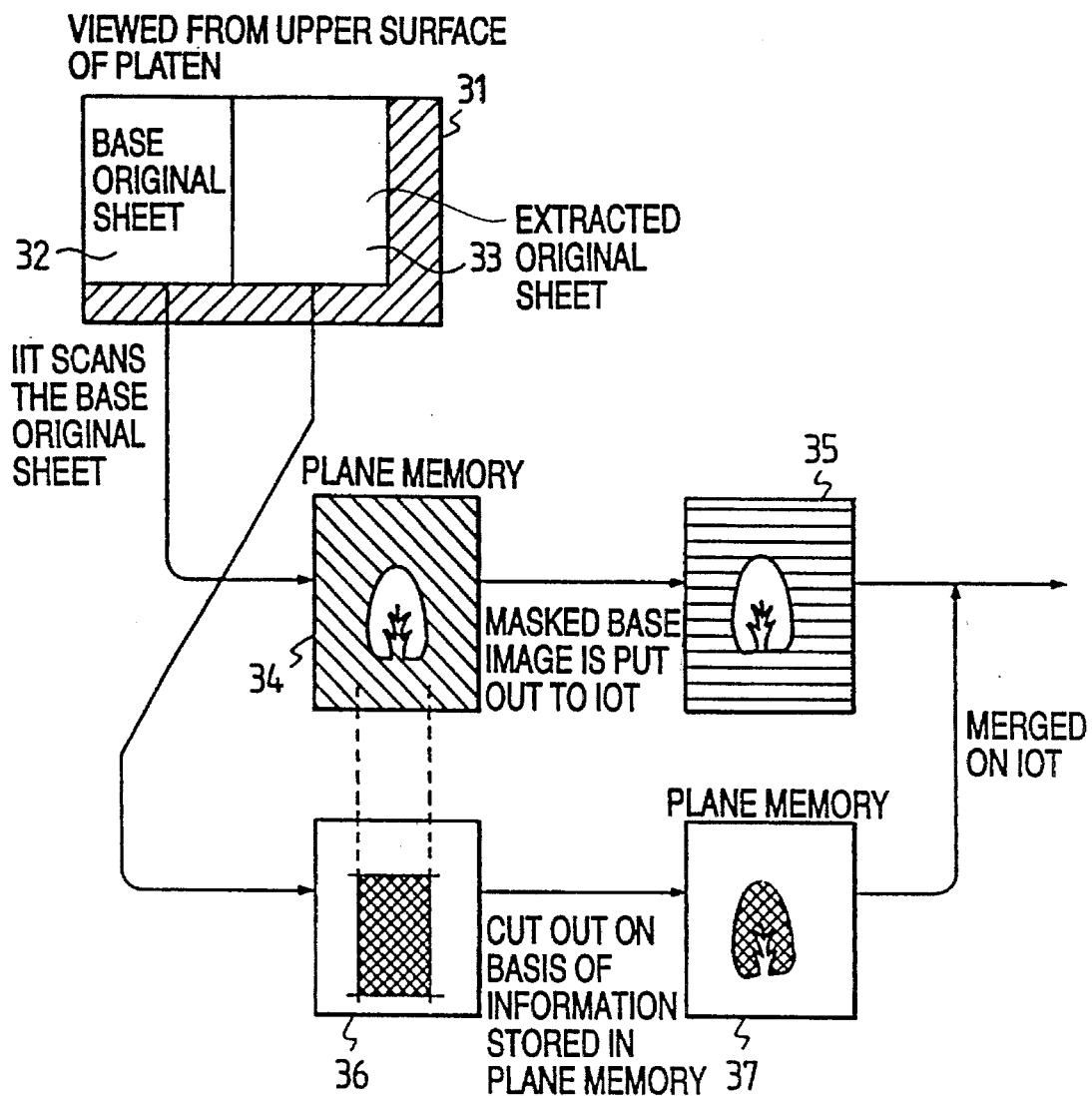
Figure 6D:
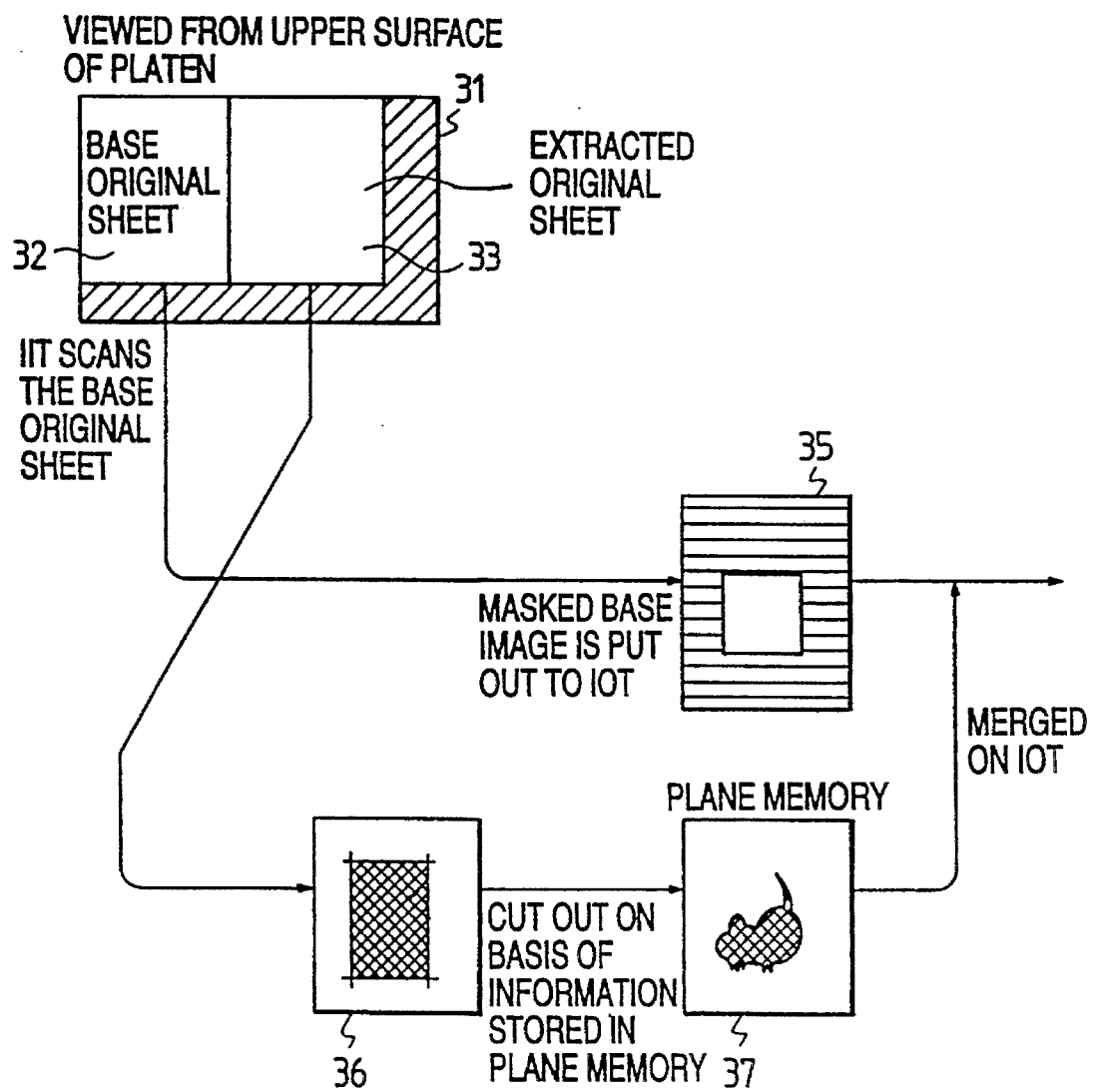
Figure 6E:
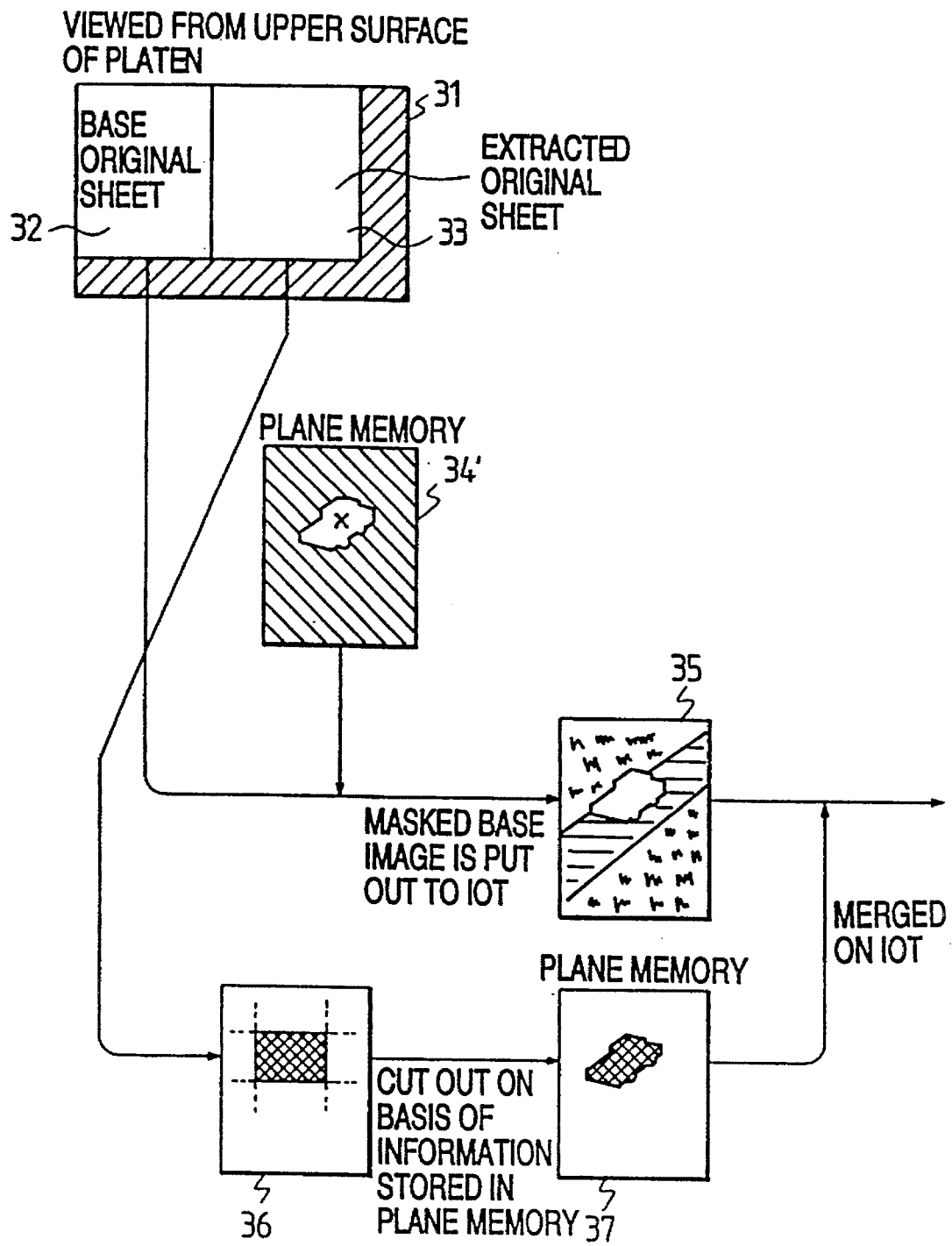
Figure 6F:
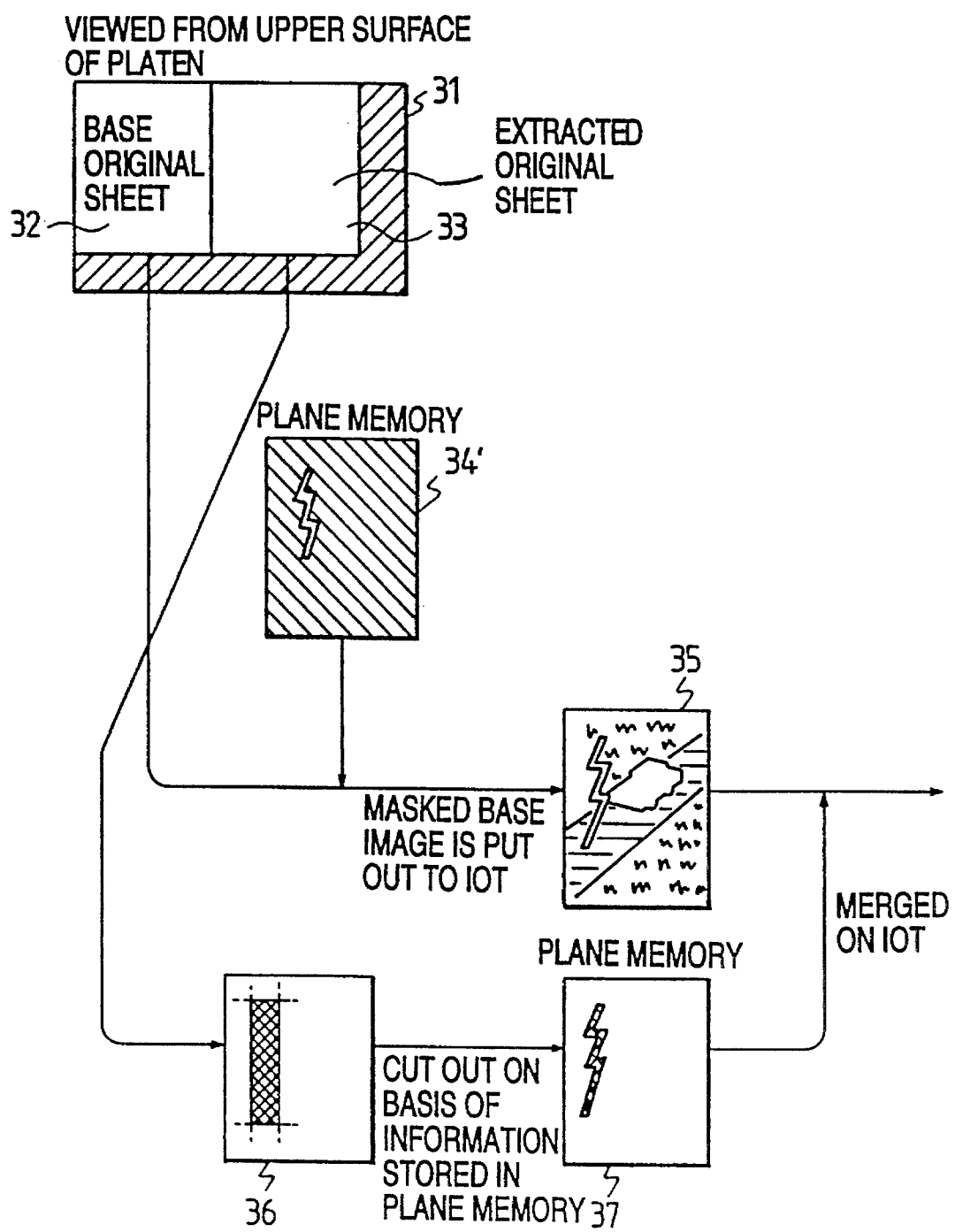

Next, a description will be made of the enchasing and synthesizing function according to the present invention. FIG. 2 is a block diagram illustrating a description of an output produced by the enchasing and synthesizing function. FIGS. 3 (a) through 3(e) are sets of charts illustrating examples of the combination of areas formed by the performance of the enchasing and synthesizing function. FIGS. 4 (a) and 4 (b) are block diagrams for explaining the setup of the plane memory. FIG. 5 is a flow chart illustrating a description of the flow of operations for processing the setup of areas.

In case the enchasing and synthesizing function is to be performed, the masked area 3 of the base original sheet 1 and the trimmed area 4 of the extracted original sheet 2 are set operations, the image processing section 6 first obtains an output of the base image 11 as masked by the masked area set up in the plane memory 10-1 in the copy scan of the base original sheet 1 and then enchases the image of the trimmed area set up in the plane memory 10-2 into the base image 11 as masked in the copy scan of the extracted original sheet 2 and synthesizes the two images, and thereafter puts out the enchased and synthesized image 12, as shown in FIG. 2.

In the setup of the masked area 3 and the trimmed area 4, the areas respectively set up are written to the plane memory 10 in accordance with such various modes as the input of the coordinates for indicating the points for the individual areas with the base original sheet 1 and the extracted original sheet 2 placed on the editing pad 8, the input of coordinates entered for the areas by operations on the numerical value keys on the user interface (U/I) 9, and the input of markers by which the marker areas are read on the base original sheet 1 and the extracted original sheet 2 from the image input section 5 in the prescan operation.

The present invention is designed in such a manner as to be capable of employing a combination of specified areas formed in various shapes by making a proper alignment of the center of such an area through introduction of a circumscribed rectangle not only to a rectangular area but also to areas in shapes which can be selected arbitrarily for the extracted area and the masked area. Owing to this feature, the present invention performs the area positioning by bringing the center of a masked area into its proper alignment with the center of an extracted area, using a rectangle which forms a contact with the outer circumference of an individual area (namely, a circumscribed rectangle), for example, in case an extracted (i.e., trimmed) area and a masked area are in a rectangular s ape as shown in FIG. 3 (a), or in case the masked area is in a freely formed shape, a polygonal shape, or a traced shape as set in contrast with the rectangular extracted area as shown in FIG. 3 (b), or in case the masked area is in a rectangular shape on the contrary as set in contrast with the extracted area formed in a freely formed shape, a polygonal shape, or a traced area as shown in FIG. 3 (d). Moreover, the area positioning is performed by bringing the center of the extracted area into its proper alignment with a specified point of the masked area, in case the masked area is formed in a specified frame in relation to the extracted area in a rectangular shape as shown in FIG. 3 (c), or in case the masked area is in the same shape formed around one specified point as set in contrast with the extracted area formed in a free shape, a polygonal shape, or a traced shape as shown in FIG. 3 (e). Then, in each of such cases as just described, the part of the extracted area extending outside of the masked area is cut off, and the part of the marked area extending outside of the extracted area is rendered blank in white. However, in the case the marked area and the extracted area are in an identical shape with one point specified for them, as shown in FIG. 3 (e), it goes without saying that there will not be any cut part or any part rendered blank in white.

With a view to performing an enchasing and synthesizing operation as shown in FIGS. 3 (a) through 3 (d), the present invention sets a masked area specified as shown in FIG. 4 (a) as it is in the plane memory 10-1, in case the reduction and magnification factor is 100% for both of the masked area and the trimmed area, and the logic processing section 21 performs arithmetic operations for finding a logical product of the specified trimmed area 4 with the masked area 3 and sets up the value of the logical product thus obtained in the plane memory 10-2. By the effect of this processing operation, any part of the trimmed area 4 extending outside the masked area 3 is cut off, and any part of the masked area 3 extending outside the trimmed area 4 is rendered blank in white. However, in the case of an enchasing and synthesizing process shown in FIG. 3 (e), the specified trimmed area 4 is set up as it is in the plane memory 10-2 by the logic processing section 21' shown in FIG. 4 (b) and is also set up, with the center of the circumscribed rectangular shape set in its proper alignment with the specified point of the masked area 3, in the area plane memory 10-1, which is in a shape identical with that of the trimmed area 4.

Ordinarily, the enchasing and synthesizing function is performed to set up a desired image as a trimmed area in the extracted original sheet, to extract the trimmed area containing the desired image from the extracted original sheet and to enchase the extracted image into the masked area on the base original sheet. Consequently, it happens in some cases that a trimmed area in the extracted original sheet is larger or smaller in comparison with the base original sheet used at the magnification of 100%. In such a case, it is feasible to perform a processing operation like the one shown in FIG. 5, in order to eliminate those parts which are to be cut off or rendered blank in white as mentioned above, and thereby to form an image in the trimmed area as reduced or magnified to match the size of the masked area.

In the setup of an area with a magnifying or reducing process performed on a trimmed area, the information specifying a masked area and a trimmed area is first entered (step S1), as shown in FIG. 5. Then, it is examined whether or not the masked area is in a rectangular shape, and, in case the masked area is not in any rectangular shape, a circumscribed rectangle is found and the masked area is set up in the plane memory (steps S2 through S4).

Also for the trimmed area, it is examined in the same manner whether or not the trimmed area is in a rectangular shape, and, in case the trimmed area is not in any rectangular shape, a circumscribed rectangle is found (steps S5 and S6).

Next, it is examined whether or not the magnification is set not at the fixed magnification of 100%, but at a variable magnification, and, in case the magnification is set at a variable magnification, the magnification is found by arithmetic operations through comparison of the rectangular shape or circumscribed rectangle of the masked area and the rectangular shape or circumscribed rectangle of the trimmed area (steps S7 and S8).

Then, the position for the setup of the trimmed area is found by arithmetic operations, and the trimmed area is set up at the magnification found by arithmetic operations performed with reference to the setup position and stored in the plane memory (steps S9 and S10). In this case, the trimmed area is drawn as moved in such a manner that the positions of the central point of the masked area and the central point of the trimmed area in the main scanning direction will be put into agreement through correction made of the trimmed area by the amount corresponding to the magnification in the subsidiary scanning direction.

The masking operation in the copy scans is performed by a painting process in white in the image processing system (IPS). In contrast with this, the trimming operation is performed by controlling the scans, which are performed by the image input terminal (IIT), in respect of its movement in the subsidiary scanning direction, and the trimming in the main scanning direction is performed by a trimming operation performed in the image processing section. For this reason, the proper positioning of an extracted original sheet is effected by its movement by the image input terminal in the subsidiary scanning direction, by its movement by the image processing system in the main scanning direction, and the adjustment of the magnification is made by the control of the scanning speed of the image input terminal in the subsidiary scanning direction and by the setup of the registering position by the image processing system in the main scanning direction.

Next, with reference to FIGS. 6 (a) through 6 (f), a description will be made of examples of the enchasing and synthesizing process as applied to a combination of the individual areas.

FIG. 6 (a) illustrates an example in which a rectangle is enchased in an area in a freely formed shape or a polygonal shape, FIG. 6 (b) illustrates an example in which a rectangle is enchased in a trace, and FIG. 6 (c) illustrates an example in which a rectangle is enchased in an area with specified frame. In these cases, the IIT first scans the base original sheet after an area is set up in the plane memory by operations on the user interface U/I, and the IIT puts out a base image 35 as masked with an area in the plane memory 34. Subsequently, the IIT moves in the subsidiary scanning direction and scans the trimmed area, and a movement in the main scanning direction is made by the line buffer of the IPS. Then, the image 36 of the trimmed area is cut out in the area in the plane memory 37, and the trimmed area thus cut out is synthesized with the base image 35 by the IOT, to put out a copy produced by the enchasing and synthesizing process. In this enchasing and synthesizing process, it will be possible to obtain a synthesized copy produced by masking a suit of clothes, for example, and enchasing cloth in various patterns in the masked image.

FIG. 6 (d) illustrates an example of the processing operations for enchasing a freely formed shape or a polygonal shape in a rectangular shape. In this example, the IIT first scans the base original sheet and converts the masked area in a rectangular shape specified by the IPS to white color, thereby putting out the masked base image 35. Subsequently, the IIT moves in the subsidiary scanning direction and scans the trimmed area and then makes a movement in the main scanning direction by the effect of the line buffer of the IPS, cutting out the image 36 in the area of the plane memory 35, synthesizing the image 36 thus cut out with the base image 35 by the action of the IOT, and putting out a copy thus produced by the enchasing and synthesizing process. In this enchasing and synthesizing process, it is possible to enchase only the extracted image to the exclusion of the background area.

FIG. 6 (e) presents a diagram illustrating an example in which a freely formed shape or a polygonal shape is enchased in an identical shape with one point specified for it, and FIG. 6 (f) presents a diagram illustrating an example in which a trace is enchased in an identical shape with one point specified for it. In these cases, after the area is moved on the plane memory 34' in such a way that the centers of freely formed shapes or the like are brought into agreement with the specified point, the IIT performs a scanning operation on the base original sheet and puts out the base image 35 which is masked with an area in the plane memory 34'. Subsequently, the IIT moves in the subsidiary scanning direction, scans the trimmed area, and cuts out the image 36 in the area of the plane memory 37, performing a movement in the main scanning direction by the effect of the line buffer of the IPS, and then puts out a copy of an enchased and synthesized image which is formed by synthesis of the image 36 with the base image 35 in the IOT. In this enchasing and synthesizing process, it is possible to enchase a freely formed shape or the like in an arbitrarily selected position without losing the background of the base original sheet.

Figure 7A:
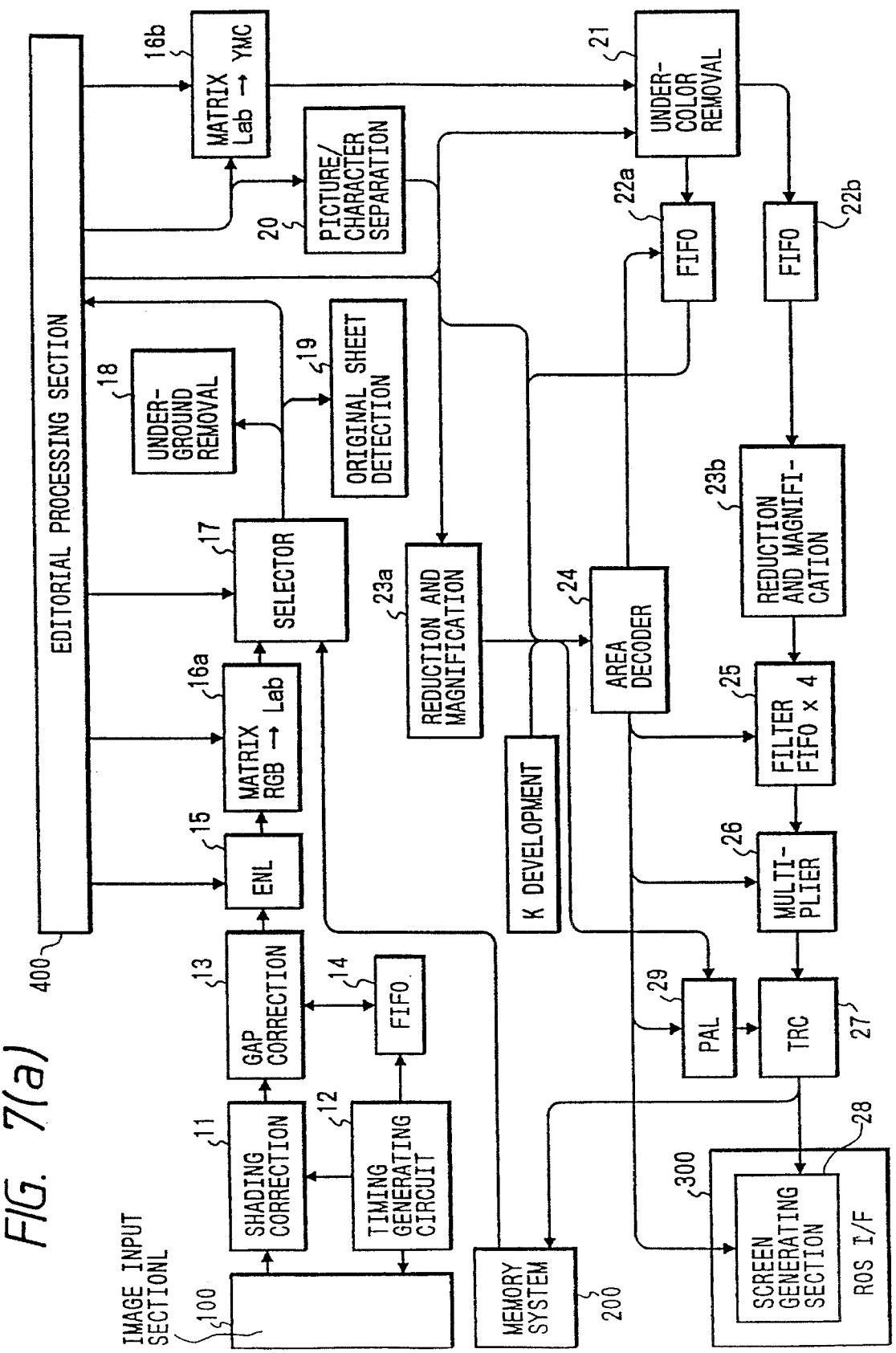
FIGS. 7 (a) and 7 (b) are block diagrams illustrating an example of the construction of the signal processing system in the image processing system.
Figure 7B:
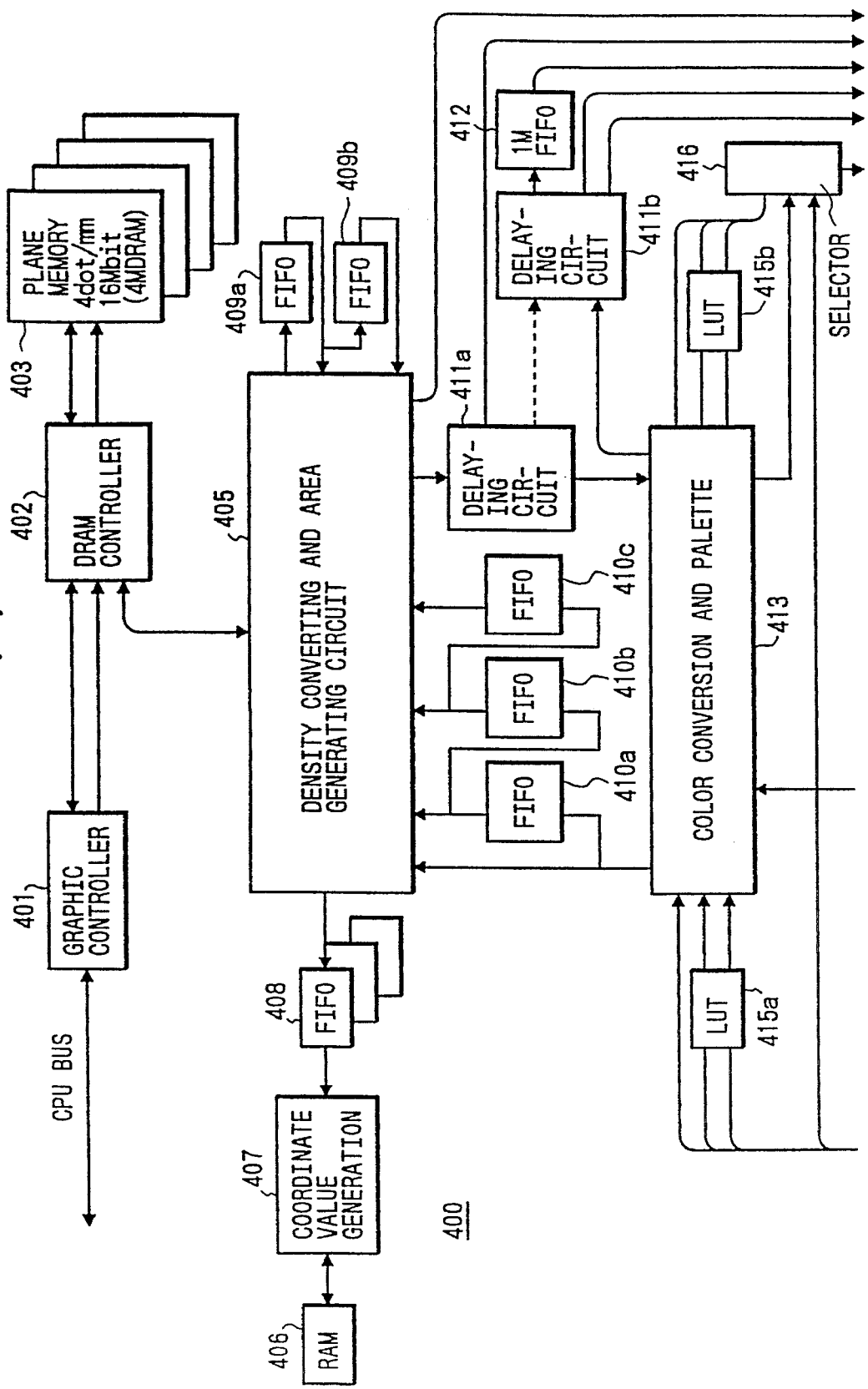
Figure 8:
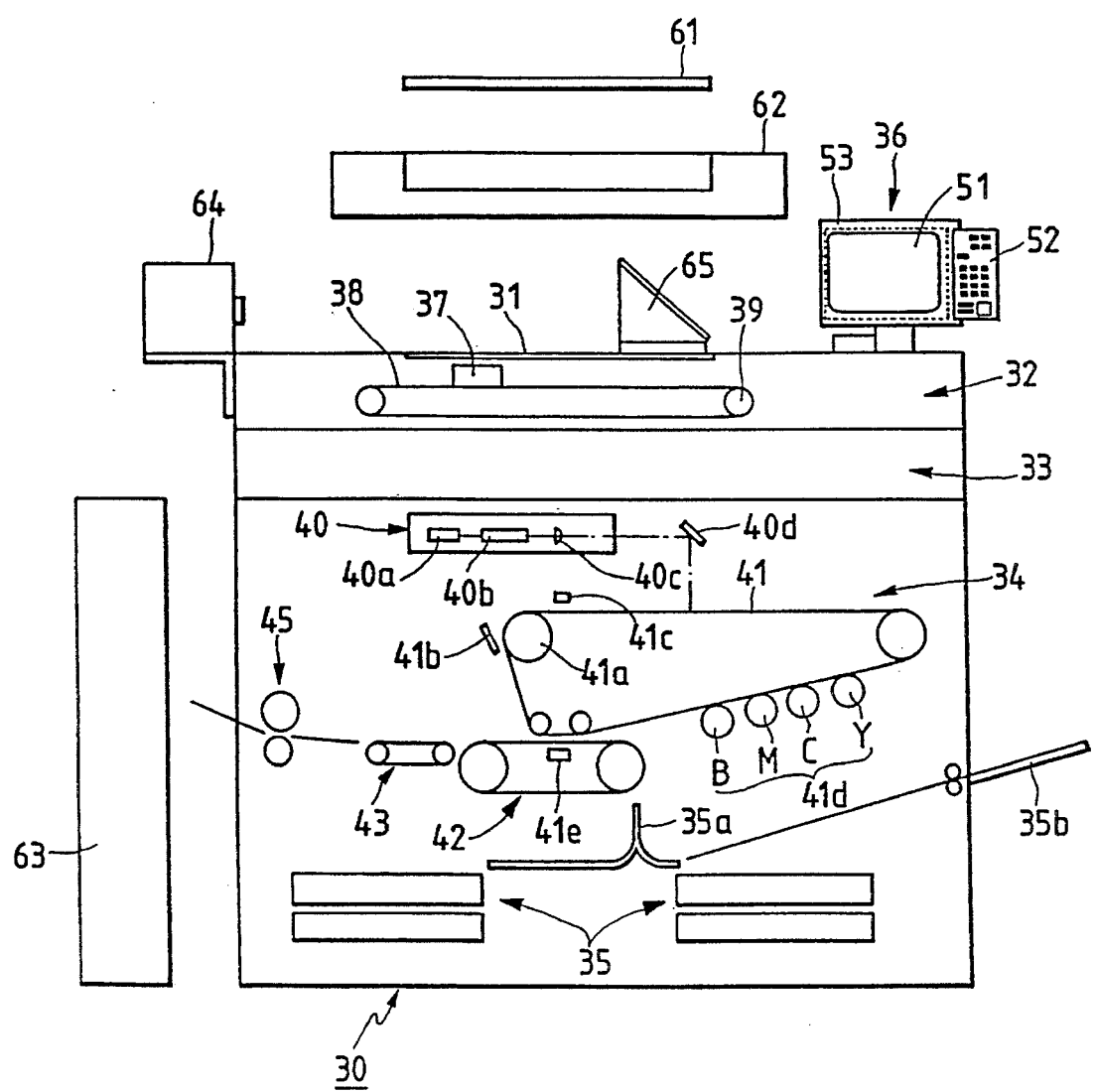
FIG. 8 is a diagram illustrating an example of the construction of the mechanism of the image processing system.
Figure 9:
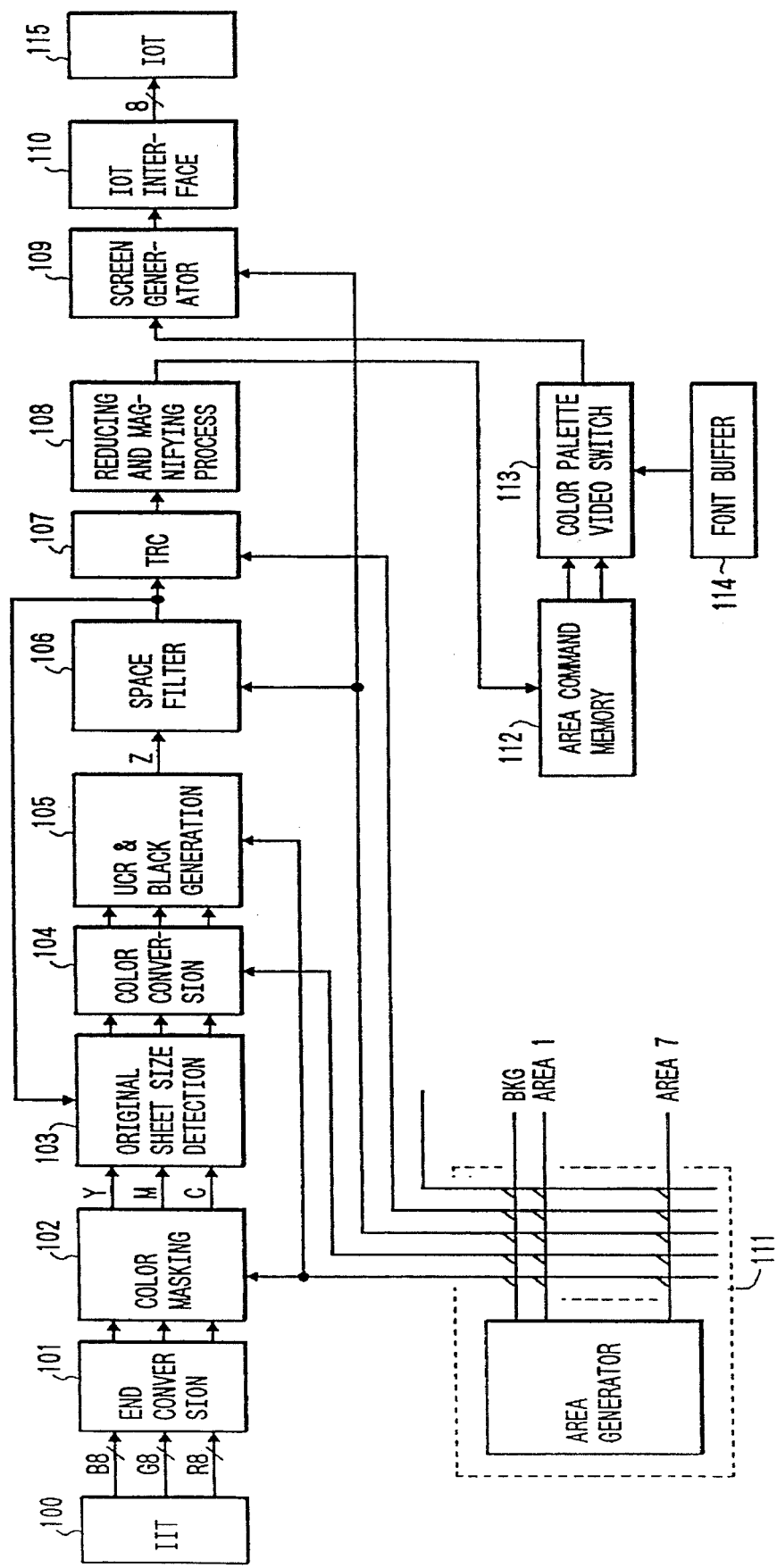
FIG. 9 is a block diagram illustrating an example of the construction of a conventional color digital copying machine.
Figure 10:
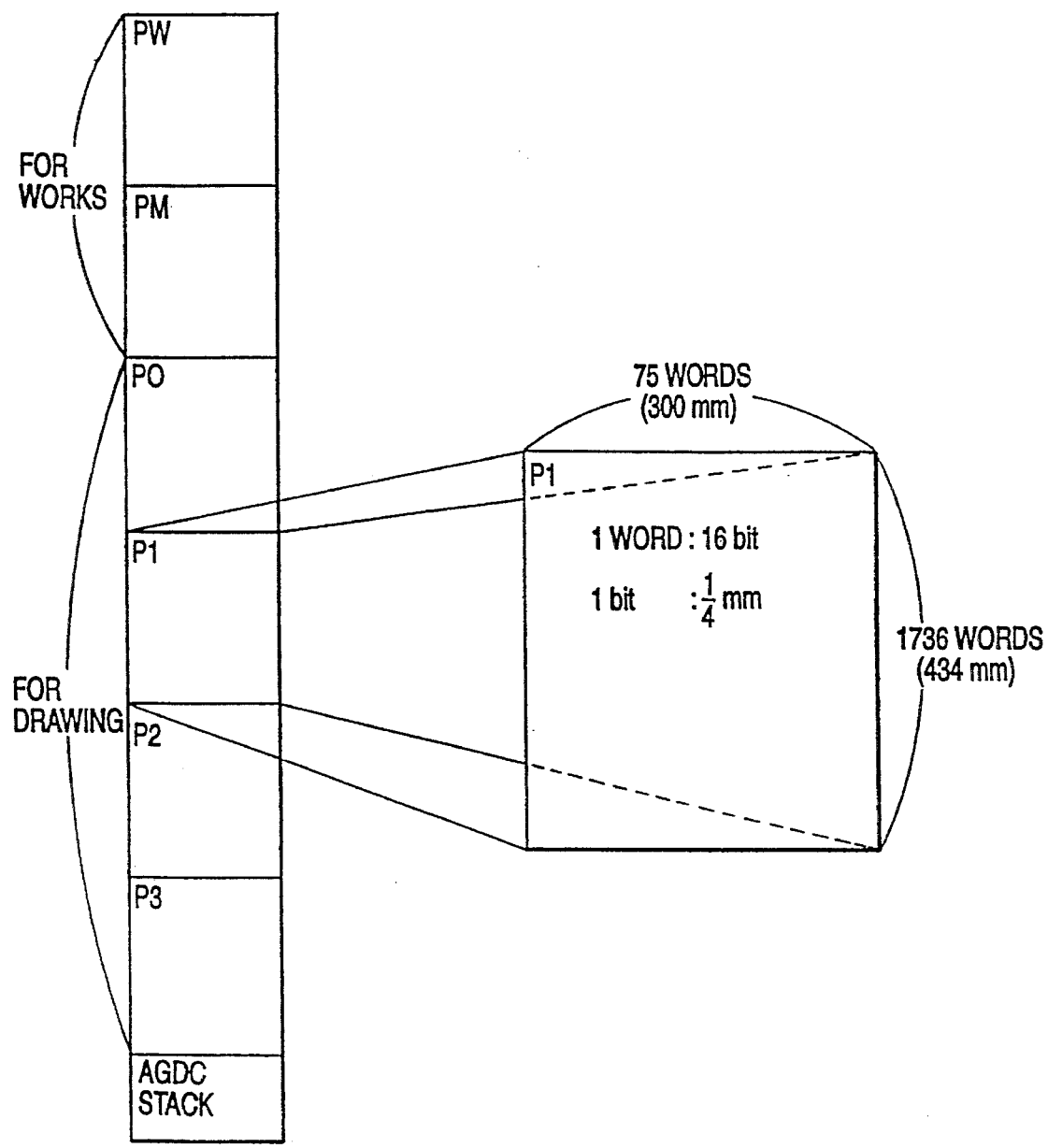
FIG. 10 is a chart illustrating an example of the construction of a plane memory.
Figure 12:
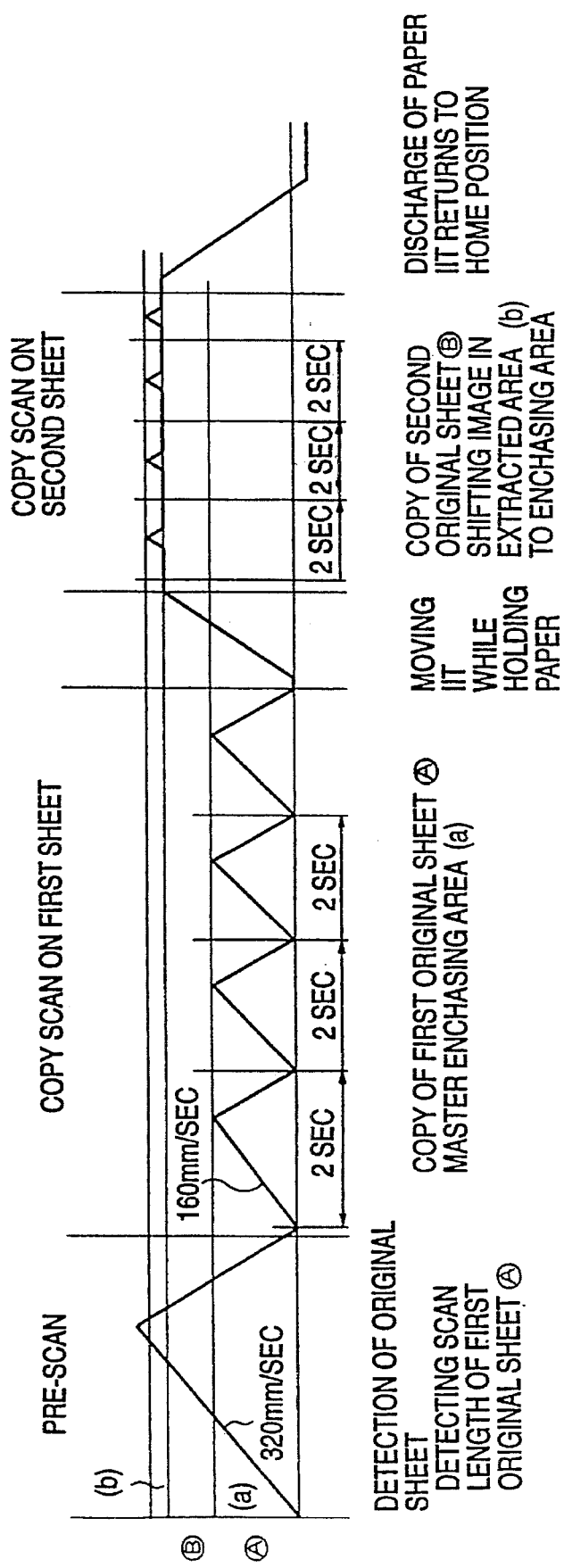
FIG. 12 is a chart illustrating the waveform of a pre-scan and the waveform of copy scans for the performance of the enchasing and synthesizing function.
Figure 13A:
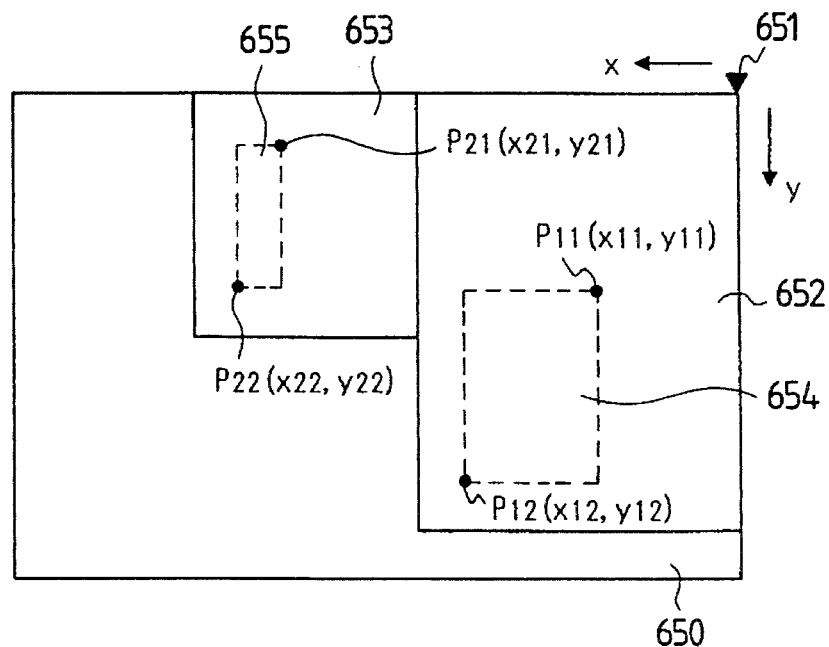
FIGS. 13 (a) and 13 (b) are charts illustrating a description of the manner how an original sheet is to be placed for the performance of the enchasing and synthesizing function.
Figure 13B:
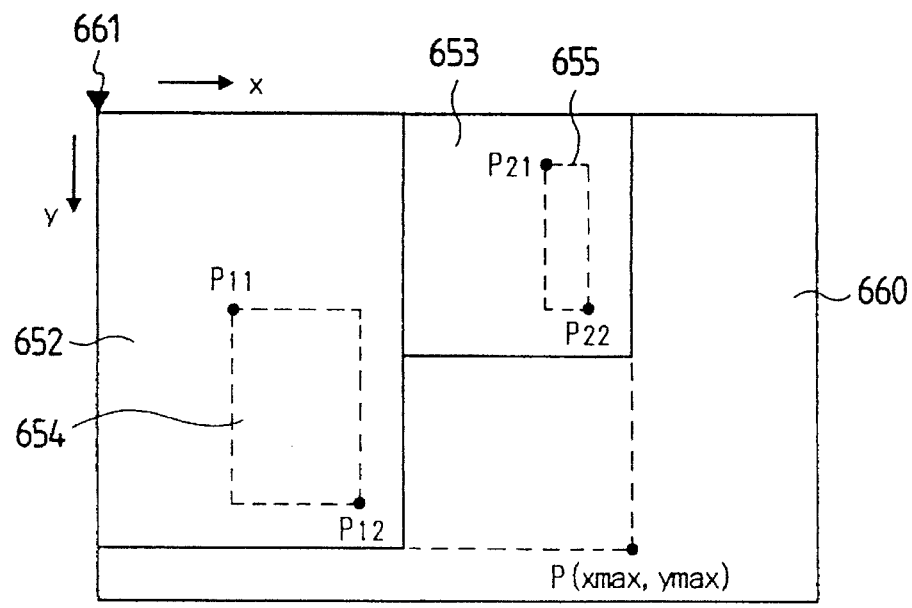
Figure 11:
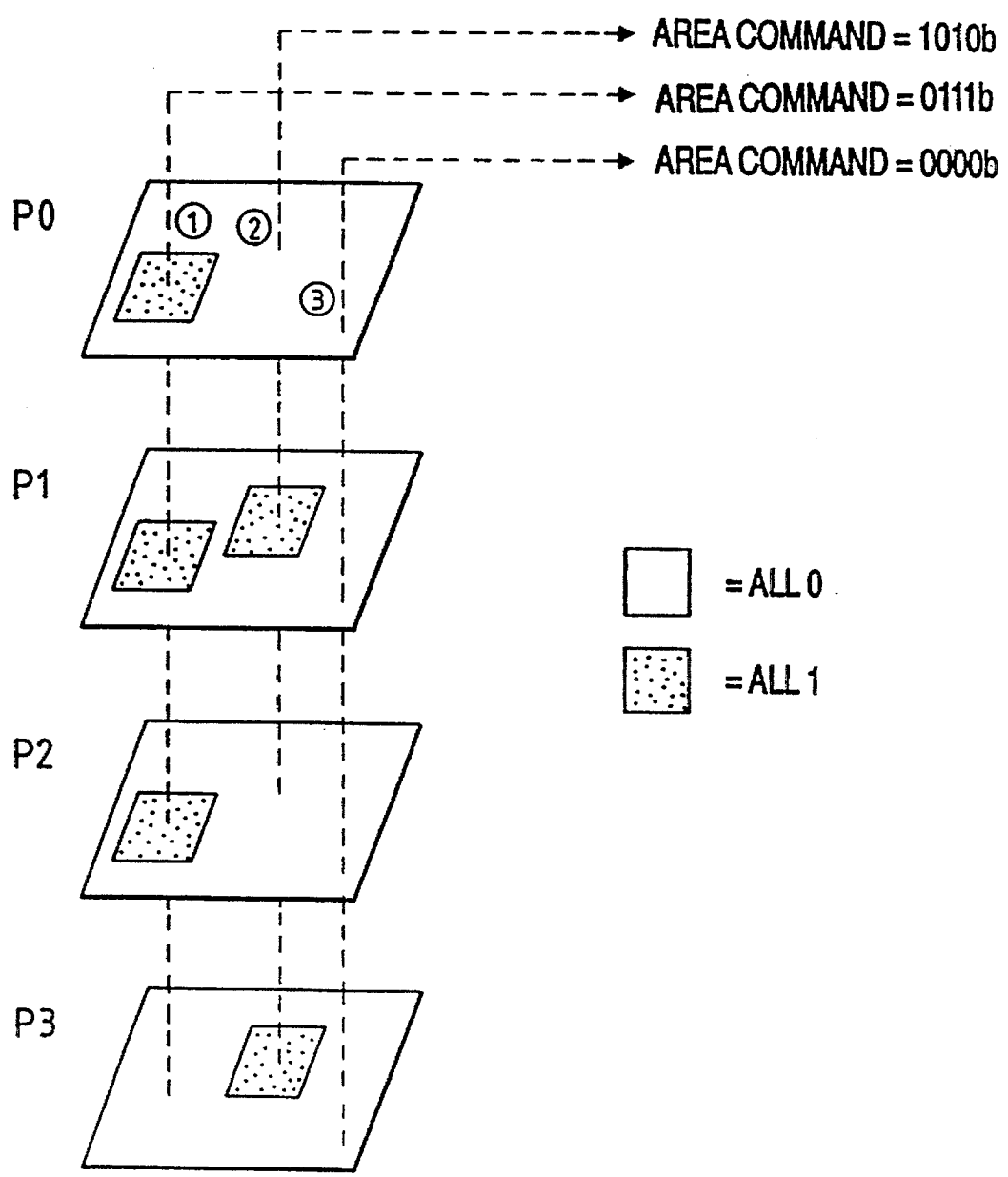
FIG. 11 is a chart illustrating an example of the correspondence between the drawing contents of the image on the plane memory and area commands.

Next, an example of construction of an image processing system to which the present invention as described above is applied. FIGS. 7 (a) and 7 (b) present block diagrams illustrating an example of the construction of the signal processing system in the image processing system. FIG. 8 is a diagram illustrating an example of the construction of the mechanism of the image processing system.

With reference to FIG. 7 (a), it is to be observed that the image input section 100 has a sensor formed in a reduced size with three CCD line sensors for B, G, and R, which are arranged, for example, at right angles with the subsidiary scanning direction, and this image input section 100 is an IIT which performs an operation for reading an image, performing a scanning operation in the main scanning direction in synchronization with the timing signal generated from a timing generating circuit 12 while moving in the subsidiary scanning direction at a speed corresponding to the reduction ratio or the magnification ratio, and the analog image data are converted, for example, into digital image data in eight bits in expression of the chromatic gradations. The image data are given a shading correction in the shading correction circuit 11 for removal of dispersions which have occurred among the individual pixels as the result of various factors, and the gaps among the individual line sensors are corrected in the gap correcting circuit 13. The correction of the gaps is made by delaying the read image data by the FIFO 14 by an amount corresponding to the gaps among the CCD line sensors, so that the image data in B, G, and R in the same position may be obtained at the same time. An equivalent neutral lightness (ENL) converting circuit 15 performs a gray balancing process on the image data, using a parameter appropriate for the type of the original sheet and is also designed in such a way as to be capable of making a negative-positive reversal only in a specified area, for example, by a negative-positive reversal by reversing the manner of using gray for each pixel with a negative-positive reversal signal generated from an editorial processing section 400, which will be described later.

The image data in B, G, and R which are processed in the ENL converting circuit 15 are converted, for example, into uniform color space signals L*, a*, and b* by a matrix circuit 16a. The uniform color space signals L*, a*, and b* respectively represent axes of coordinates one crossing the other at right angles, L* expressing the luminosity while a* and b* respectively expressing the chromaticity plane (hue and chroma). The conversion of the image data in B, G, and R into the uniform color space signals L*, a*, and b* makes it easier to form an interface with such external equipments as a computer system via a memory system 200 and also makes it easier to detect a color conversion, an editing process, and information on images. A selector 17 performs texture synthesis and watermark synthesis, selectively taking out the output from the matrix converting circuit 16a or the image data from the memory system 200, which is an interface with external equipments, or taking both of the image data at the same time. For this purpose, the selector 17 has the functions for performing the setting of a synthesis ratio, arithmetic operations, and the synthesizing process with respect to synthesized images.

An under-ground removing circuit 18 improves the quality of copies made of such original sheets as newspapers stained with a fog, detecting the density of the under-ground, for example, with reference to a histogram indicating the density of original sheets and omitting those pixels which are lower in density than that of the under-ground. An original sheet detecting circuit 19 detects and stores the size of the original sheet through detection of a boundary line between the back surface of the black platen and the original sheet and thereby finding a circumscribed rectangle. In the under-ground removing circuit 18 and original sheet detecting circuit 19 uses the signal L* for the information on luminosity among the uniform color space signals L*, a*, and b*.

The editorial processing section 400 sets up area commands for switching the editing processes, the parameters, and so forth for each area and generates area control signals on the basis of the area commands, and, with these, the editorial processing section 400 performs such processing operations as color editing, color conversion, and marker color detection on the image data. Then, the image data which have been subjected to such processing operations are fed into the matrix converting circuit 16a and a picture/character separating circuit (TIS circuit) 20.

The image data thus subjected to editing processes are converted from the signals L*, a*, and b* into the toner colors, Y, M, and C in the matrix converting circuit 16a and an area recognition is made in the picture/character separating (TIS) circuit 20 by distinguishing such areas as color characters, black characters, and picture patterns (characters and half-tone images) in respect of each of blocks respectively formed of a plural number of pixels. The under-color removing circuit 21 generates a plate in black (K), in correspondence with the mono-color/full-color signal, from the image data in Y, M, and C as converted by the matrix converting circuit 16b and performs a removal of the colors, Y, M, and C in an equal amount, thereby putting out image data in the process colors and further generates hue signals (Hue) by making a decision on the hue. Moreover, when the pixels are processed for recognition of their areas by the picture/character separating (TIS) circuit 20, for example, a delay by 12 lines, for example, will occur to the signals for area recognition for the formation of the blocks, and it is the FIFO 22a and FIFO 22b, which keep the timing for synchronizing the hue signals and the image data with such a delay.

The reducing and magnifying circuit 23b processes the image data for their reduction in size or for their magnification in accordance with a specified reduction ratio or a specified magnification ratio, and, as regards the magnification and reduction of the image data in the subsidiary scanning direction, the image input section 100 performs the reducing and magnifying process by varying its scanning speed in accordance with the specified reducing or magnifying ratio. This reducing and magnifying circuit 23b performs a thinning-out operation and an interpolating operation with respect to the main scanning direction. The reducing and magnifying circuit 23a performs reducing and magnifying operations on the area commands in such a manner that the area for the execution of the area control information will not be deviated in correspondence with the reducing and magnifying operation performed on the image data. The area control information subjected to the reducing and magnifying operations are decoded by an area decoder 24 and applied to the processing of the individual blocks processed. The area decoder 24 generates and distributes a parameter for a filter 25, a coefficient for a multiplier 26, and a switching signal for the parameter for a TRC circuit 27 from the area commands, the area discriminating signals, and the hue signals.

The filter 25 performs the removal of moires in half tone and the emphasis of the edges of characters, in correspondence with the space frequency, on the image data reduced or magnified in size by the reducing and magnifying circuit 23b. The TRC circuit 27 makes an adjustment of density in accordance with the characteristics of the IOT, using a conversion table. A PAL 29 is a decoder which switches the parameter on the conversion table for the TRC circuit 27 on the basis of signals on the developing process and the discrimination of the areas. The multiplier 26 performs arithmetic operations based on the expression, ax+b, with respect to the image data x, applying the coefficients a and b, to switch the coefficient to "through" in the case of half-tone images and to "high γ" in the case of characters. Then, with the multiplier 26 used together with the TRC circuit 27, it is possible to perform color control and density control on color characters, black characters, and picture patterns by selecting the coefficient for each color component and a conversion table as appropriate. Also, it is possible to place an emphasis on the edges of characters by applying the coefficients a and b through the standardization of the parameter for the filter 25. The image data adjusted by these control devices are either stored in the memory system or put out as mesh point images developed in dots by a screen generating section 28 of an ROS 300. With the enchasing and synthesizing process according to the present invention as applied together with the operation of the multiplier 26, it is possible also to erase the trimmed image getting out into the outside of the masked area.

The editorial processing section 400 performs such operations as a color conversion, a color editing job, and the generation of an area control signal and receives the input of the image data L*, a*, and b* fed out from the selector 17. Then, information on chromaticity is converted from the system of coordinates a and b crossing each other at right angles into C and H in the polar coordinate system in order to make it easier to perform such operations as color detections of the marker colors and others, color editing, and color conversion with an LUT 415a. A color conversion and palette 413, which has the colors used for color conversion and color editing work on 32 kinds of palettes, performs such processing operations as a detection of a marker color, color editing work, and a color conversion on the image data L, C, and H in accordance with an area command issued via a delay circuit 411a. Thus, only the image data in the area subjected to a color processing operation, such as a color conversion, are processed by the color conversion and palette 413, and the image data thus processed are converted in reverse from C and H into a and b with reference to the LUT 415b and thereafter the image data in any area other than those thus processed are directly put out from the selector 416 and sent into the matrix converting circuit 16b mentioned above.

The marker colors (three colors) which have been detected from the image data by the color conversion and palette 413 and the four-bit signals in the closed areas are sent to a density converting and area generating circuit 405, and this density converting and area generating circuit 405 performs a conversion of density of pixels from 400 spi to 100 spi through a processing operation for conversion into binary values, in which the value "1" is selected in case the black pixels are found to be present in a number not less than a predetermined number among the 16 pixels in a 4×4 window with the FIFOs 410a, 410b, and 410c used for the operation. The marker signals (in closed loops and marker dots) which are generated in this manner are written from the density converting and area generating circuit 405 to the plane memory 403 via a DRAM controller 402.

Moreover, the marker dot signals are delayed by three lines by the FIFO 408 and formed into a 3×3 window, lest minute particles of dust should be detected by error as markers, and the detection of the marker dots and the generation of the coordinate values are performed by a coordinate value generating circuit 407, and the detected marker dots and the generated coordinate values are stored in a RAM 406. In this regard, it is to be noted that the marker dots are stored also in the plane memory 403, but that this process is performed in order to prevent errors in detection.

The plane memory 403 is a memory for storing the area commands therein for the purpose of performing a color conversion, a color editing job, and other area editing jobs, and this plane memory 403 can permit a designation of an area by operations performed, for example, on the editing pad and can accept area commands written to such a designated area in it. That is to say, the area commands in any area designated by operations on the editing pad are transferred to a graphic controller 401 by way of the CPU bus and then written from the graphic controller 401 to the plane memory 403 via a DRAM controller 402. The plane memory 403 is composed of four planes and can accept 16 kinds of area commands from 0 to 15 set up on it.

The four-bit area commands which are stored in the plane memory 403 are read out of the plane memory in synchronization with an output of image data and used for such processing operations as the editing processes performed on the color conversion and palette and also for such purposes as the switching of the parameters for the image data processing system, the ENL converting circuit 15, the matrix converting circuit 16, the selector 17, the under-color removing circuit 21, and, furthermore, the filter 25, the multiplier 26, the TRC circuit 27, the screen generating section 28, and so forth by way of the area decoder 24, as shown in FIG. 7 (a). On the occasion when the area commands are read out of the plane memory 403 and used for the editing processes performed with the color conversion and palette 413 and for such purposes as the switching of the parameters in the image processing system, it is necessary to perform a conversion of the density from 100 spi to 400 spi, and this conversion is performed by the density converting and area generating circuit 405. The conversion of the density from 100 spi to 400 spi is performed so as not to form any ruggedness on the boundaries between the closed loop curves and between the editing areas or the like by the effect of an interpolation made of the data with reference to the patterns developed by forming 3×3 blocks, using the FIFOs 409a and 409b, in the density converting and area generating circuit 405. The delay circuits 411a and 411b, 1M FIFO 412, and so forth are used for the timing adjustments to be made between the area commands and the image data.

The color copying machine shown in FIG. 8 is constructed with a base machine 30, which is comprised of a platen glass 31, which accepts an original sheet loaded on its upper surface, an image input terminal (IIT) 32, an electrical system control unit housing 33, an image output terminal (IOT) 34, a paper tray 35, and a user interface (U/I) 36, and the copying machine is provided also with such optional parts as an editing pad 61, an automatic document feeder (ADF) 62, a sorter 63, and a film picture reading apparatus comprised of a film projector (F/P) 64 and a mirror unit (M/U) 65.

The image input terminal 32, which is comprised of an imaging unit 37, a wire 38 for driving the imaging unit 37, driving pulleys 39, and so forth, performs operations for converting the image information on a color original sheet as decomposed into the three primary colors of light, namely, blue (B), green (G), and red (R) by means of a color filter provided in the imaging unit 37 and read with CCD line sensors, then converts the image information thus converted into digital image data in B, G, and R in multiple chromatic gradations, and furnishes an output of the digital image data to an image processing system. The image processing system is accommodated in the electrical system control unit housing 33 and performs various kinds of processing operations, such as various kinds of conversions, correcting processes, and editing processes, in order to receive the input of the image data in B, G, and R and to enhance the picture quality of the reproduced images in terms of color, chromatic gradations, accurate rendition of fine details, and so forth and to improve the overall reproducing performance of the color copying machine, converts the image data obtained in the three primary colors of light into the primary toner colors, namely, yellow (Y), magenta (M), cyan (C), and black (K), converts the toner signals representing chromatic gradations into toner signals in binary values for on and off, and puts out the toner signals to the image output terminal 34. The image output terminal, which is provided with a scanner 40 and a photoreceptor belt 41, converts the image data into light signals in a laser output unit 40a, forms a latent image corresponding to the original image on the photoreceptor belt by means of a polygon mirror 40b, an F/θ lens 40c, and a reflecting mirror 40d, transfers the developed image onto printing paper transported from the paper tray 35 and then discharges a color copy from the copying machine.

The image output terminal 34 is provided with the photoreceptor belt 41, which is driven with a driving pulley 41a, provided also with a cleaner 41b, a charge Corotron 41c, a developing unit 41d for each of the process colors, Y, M, C, and K, and a transfer device 41e, which are arranged in the proximity of the photoreceptor belt 41 and the driving pulley 41a, and provided also with a transfer unit 42, which is arranged in a position confronting the transfer device 41e. Then, a paper transport mechanism takes up a sheet of printing paper as it comes transported from the paper tray 35 via a paper transport path 35a, and, after the latent images respectively formed in the process colors, Y, M, C, and K onto the printing paper by turning the transfer unit 42 four times in the case of a full-color copying process in four colors, the paper transport mechanism transports the paper from the transfer unit 42 via a vacuum transport unit 43 to a fusing unit 45, in which the transferred images are fused on the paper, and thereafter discharges the paper from the copying machine. A single sheet inserter (SSI) 35b selectively feeds printing paper by manual paper-inserting operation into the paper transport path 35a.

The user interface 36, which is used by the user for selecting the desired functions and for giving instructions on the conditions for executing the selected functions, is provided with a color display unit 51 and a hard control panel 52, and it is designed to accept instructions given directly by operating the "soft buttons" on the screen in combination with an infrared touch board 53.

The electrical system housing unit 33 accommodates a plural number of control boards constructed separately for the individual processing units including the image input terminal 32, the image output terminal 34, the user interface 36, the image processing system, the film projector 64, which were described above, and additionally the machine control board (MCB), which controls the operations of such mechanisms as the image output terminal 34, the automatic document feeder 62, and the sorter 63, as well as the SYS board which controls all these units and devices in the total system.

Moreover, the present invention is not limited to the preferred embodiment described above, but may be effectively modified in various manners. For example, the example of embodiment given above shows a process whereby the base original sheet is put out in black and white and the extracted original sheet is synthesized in three colors, and yet this process may be formed in reverse to it as described above, and it is also feasible to put out both of these original sheets in full color. Also, the reducing and magnifying circuit is arranged in a position in the downstream of the editorial processing section, which performs the enchasing and synthesizing process, but this reducing and magnifying circuit may be arranged in an upstream position.

As described hereinabove, the present invention offers an image processing system which sets up a masked area on a base original sheet and a trimmed area on an extracted original sheet as editing areas by keeping these areas in their positions properly aligned with the center as determined on the basis of a circumscribed rectangle, so that the system is capable of performing the enchasing and synthesizing process in an area other than a rectangular area, and, as the system sets up such a trimmed area by arithmetic operations performed for finding the logical product with the masked area, the system is capable of synthesizing only the images present in the area thus set up, excluding the unnecessary background part on the extracted original sheet. Furthermore, the system performs a reading scan once on the base original sheet and a reading scan three times on the extracted original sheet, putting out an image formed by the developing process in black at the reading scan performed on the base original sheet and putting out the image in the trimmed area by the developing process in three colors at the reading scans performed on the extracted original sheet mentioned above, so that the base original sheet thus rendered in black and white and the extracted original sheet thus rendered in three colors are synthesized, these enhanced operating features achieving the capability of the system to put out a enchased and synthesized copy by copying operations required for the production of one copy in full color.

What is claimed is:

1. An image processing system comprising:

area setting means for setting up a masked area on a base original sheet and a trimmed area on an extracted original sheet, positions of the masked area and the trimmed area being correlated with each other such that centers of rectangles circumscribing the masked area and the trimmed area are in alignment with each other;

image input means for performing a reading operation on the base original sheet and a reading operation on a portion of the extracted original sheet, the portion including the trimmed area set by said area setting means;

image processing means for performing a masking operation on image data of the base original sheet and performing an enchasing operation on image data of the portion of the extracted original sheet on the basis of a correlation of the positions of the masked area and the trimmed area set by said area setting means; and image output means, responsive to image data obtained by the masking operation and image data obtained by the enchasing operation, for forming a synthesized image in which an image of the trimmed area is enchased in the masked area of the base original sheet.

2. The image processing system according to claim 1, wherein said image input means performs a reading scan once on the base original sheet and a reading scan three times on the extracted original sheet, and wherein said image output means forms a partial image of the synthesized image by a development process in black in response to image data obtained through the reading scan performed on the base original sheet and forms another partial image of the synthesized image by a development process in three colors in response to image data obtained through the reading scans performed on the extracted original sheet.

3. The image processing system according to claim 1, wherein said area setting means determines a portion of the trimmed area to be enchased within the masked area of the base original sheet by arithmetic operations for a logical product of the trimmed area with the masked area.

4. The image processing system according to claim 1, wherein said area setting means calculates a ratio in size of the rectangles circumscribing the masked area and the trimmed area to set up the trimmed area as magnified or reduced in size on the basis of the ratio.

5. The image processing system according to claim 4, wherein said image input means changes scanning speed for the extracted original sheet in accordance with the ratio, moving a scanning area for the extracted original sheet in a subsidiary scanning direction in keeping with the trimmed area.

6. The image processing system according to claim 4, wherein said image processing means performs a reducing and magnifying process in accordance with the ratio, by shifting the image data read out for the trimmed area, in a main scanning direction.

7. A method of enchasing and synthesizing images comprising the steps of:

setting up a masked area on a base original sheet and a trimmed area on an extracted original sheet, positions for the masked area and the trimmed area being correlated with each other such that centers of rectangles circumscribing the masked area and the trimmed area are in alignment with each other;

reading the base original sheet and a portion of the extracted original sheet, the portion including the trimmed area;

creating first image data of an image in which the base original sheet is masked with the masked area;

creating second image data of an image to be enchased within the masked area of the base original sheet on the basis of a correlation of the positions of the masked area and the trimmed area; and responsive to the first and second image data, forming a synthesized image in which an image of the trimmed area is enchased in the masked area of the base original sheet.

8. An image processing system comprising:

area setting means for setting up a nonrectangular masked area on a base original sheet and a nonrectangular trimmed area on an extracted original sheet, positions of the nonrectangular masked area and the nonrectangular trimmed area being correlated with each other such that centers of rectangles circumscribing the nonrectangular masked area and the nonrectangular trimmed area are in alignment with each other;

image input means for performing a reading operation on the base original sheet and a reading operation on a portion of the extracted original sheet, the portion including the nonrectangular trimmed area set by said area setting means;

image processing means for performing a masking operation on image data of the base original sheet and performing an enchasing operation on image data of the portion of the extracted original sheet on the basis of a correlation of the positions of the nonrectangular masked area and the nonrectangular trimmed area set by said area setting means; and image input means, responsive to image data obtained by the masking operation and image data obtained by the enchasing operation, for forming a synthesized image in which an image of the nonrectangular trimmed area is enchased in the nonrectangular masked area of the base original sheet.

* * * * *